US011235648B2

(12) United States Patent
Oliver et al.

(10) Patent No.: US 11,235,648 B2
(45) Date of Patent: Feb. 1, 2022

(54) PICKUP TRUCK BED COVER

(71) Applicant: Michigan Vehicle Solutions, Southgate, MI (US)

(72) Inventors: Richard David Oliver, Grosse Ile, MI (US); Bruce Richard Burman, Allen Park, MI (US); Christopher Carl Dowdey, Trenton, MI (US)

(73) Assignee: AERO-X TECHNOLOGIES, LLC, Southgate, MI (US)

( * ) Notice: Subject to any disclaimer, the term of this patent is extended or adjusted under 35 U.S.C. 154(b) by 99 days.

(21) Appl. No.: 16/847,512

(22) Filed: Apr. 13, 2020

(65) Prior Publication Data

US 2020/0238803 A1 Jul. 30, 2020

Related U.S. Application Data

(62) Division of application No. 15/904,275, filed on Feb. 23, 2018, now Pat. No. 10,618,389.

(60) Provisional application No. 62/463,439, filed on Feb. 24, 2017, provisional application No. 62/521,590, filed on Jun. 19, 2017.

(51) Int. Cl.
| | |
|---|---|
| *B60J 7/00* | (2006.01) |
| *B60J 7/08* | (2006.01) |
| *B60J 10/80* | (2016.01) |
| *E05D 7/06* | (2006.01) |
| *B60J 5/10* | (2006.01) |
| *E05D 5/06* | (2006.01) |
| *B60J 7/10* | (2006.01) |

(52) U.S. Cl.
CPC .............. *B60J 7/08* (2013.01); *B60J 5/108* (2013.01); *B60J 7/0084* (2013.01); *B60J 7/106* (2013.01); *B60J 10/80* (2016.02); *E05D 5/062* (2013.01); *E05D 7/06* (2013.01); *E05D 2005/067* (2013.01); *E05Y 2900/532* (2013.01)

(58) Field of Classification Search
CPC ..... B60R 11/06; B60R 9/00; Y10T 29/49826; B60J 7/106; B60P 3/34; B22F 10/20; B22F 10/30; Y02P 10/25; B33Y 10/00; B29C 64/153
See application file for complete search history.

(56) References Cited

U.S. PATENT DOCUMENTS

| | | | | |
|---|---|---|---|---|
| D266,237 S | * | 9/1982 | Skidmore | .................... D12/404 |
| 4,496,184 A | * | 1/1985 | Byrd | ......................... B60P 7/02 |
| | | | | 135/88.09 |
| 4,511,173 A | * | 4/1985 | Wentzel | ................... B60J 5/125 |
| | | | | 160/201 |
| D281,488 S | * | 11/1985 | Collins | ........................ D12/404 |
| D289,276 S | * | 4/1987 | Collins | ........................ D12/401 |
| D294,242 S | * | 2/1988 | O'Neill | ................... 296/100.06 |
| D298,818 S | * | 12/1988 | Silliker | ........................ D12/404 |
| 4,943,108 A | * | 7/1990 | Turnbull | .................. B60J 7/141 |
| | | | | 296/100.07 |
| 5,087,091 A | * | 2/1992 | Madill | ..................... B60J 5/103 |
| | | | | 296/26.11 |
| D325,366 S | * | 4/1992 | Mansberger | ................. D12/404 |
| D328,049 S | * | 7/1992 | Sturtevant | .................... D12/404 |
| 5,209,543 A | * | 5/1993 | Harkins, Jr. | ............. B60J 7/141 |
| | | | | 296/100.07 |

(Continued)

*Primary Examiner* — Kiran B Patel
(74) *Attorney, Agent, or Firm* — Craig A. Phillips; Dickinson Wright PLLC

(57) ABSTRACT

A truck bed assembly that is fuel efficient, aesthetically pleasing and unique.

33 Claims, 18 Drawing Sheets

(56) References Cited

U.S. PATENT DOCUMENTS

| | | | | |
|---|---|---|---|---|
| D388,049 S | * | 12/1997 | Reardon | D12/403 |
| 5,951,095 A | * | 9/1999 | Herndon | B60J 7/1614 |
| | | | | 296/165 |
| D431,225 S | * | 9/2000 | Perlman | D12/404 |
| 6,309,008 B1 | * | 10/2001 | Bacon | B62D 25/06 |
| | | | | 292/38 |
| 6,505,878 B1 | * | 1/2003 | Mascolo | B60J 7/04 |
| | | | | 296/100.04 |
| 6,851,741 B1 | * | 2/2005 | Burg | B60J 7/026 |
| | | | | 296/190.11 |
| 7,182,386 B2 | * | 2/2007 | Damian | B60Q 1/302 |
| | | | | 296/100.02 |
| 7,281,744 B1 | * | 10/2007 | Schultz | B60J 7/1621 |
| | | | | 296/100.1 |
| 8,167,357 B2 | * | 5/2012 | Kitayama | B60J 5/103 |
| | | | | 296/146.8 |
| 8,408,626 B1 | * | 4/2013 | Herndon | B60R 5/042 |
| | | | | 296/26.11 |
| D765,013 S | * | 8/2016 | Hindelang | D12/401 |
| 10,086,684 B1 | * | 10/2018 | Stamm, Jr. | B60J 7/1621 |
| D859,282 S | * | 9/2019 | Dowdey | D12/401 |
| 10,449,893 B1 | * | 10/2019 | Singer | B60J 7/1226 |
| 2002/0008396 A1 | * | 1/2002 | De Gaillard | B60P 3/423 |
| | | | | 296/26.09 |
| 2004/0155484 A1 | * | 8/2004 | Lake | B60J 7/1621 |
| | | | | 296/164 |
| 2006/0012210 A1 | * | 1/2006 | Lake | B60J 7/1621 |
| | | | | 296/100.06 |
| 2008/0224495 A1 | * | 9/2008 | Greenwood | B60J 5/125 |
| | | | | 296/100.01 |
| 2008/0272627 A1 | * | 11/2008 | Joab | B60J 7/047 |
| | | | | 296/220.01 |
| 2009/0102227 A1 | * | 4/2009 | Herndon | B62D 35/001 |
| | | | | 296/100.06 |
| 2009/0256382 A1 | * | 10/2009 | Stum | B60J 7/1621 |
| | | | | 296/100.07 |
| 2009/0322111 A1 | * | 12/2009 | Fischer | B60R 9/06 |
| | | | | 296/3 |
| 2011/0095559 A1 | * | 4/2011 | Edens | B60J 7/1614 |
| | | | | 296/100.04 |
| 2016/0214542 A1 | * | 7/2016 | Rohr | B60R 9/06 |
| 2017/0259654 A1 | * | 9/2017 | McDonald, II | E05B 83/18 |
| 2018/0050581 A1 | * | 2/2018 | Sheridan | B62D 35/00 |
| 2019/0118628 A1 | * | 4/2019 | Kramer | B60J 7/0061 |
| 2020/0130485 A1 | * | 4/2020 | Ireland | B60J 7/062 |

\* cited by examiner

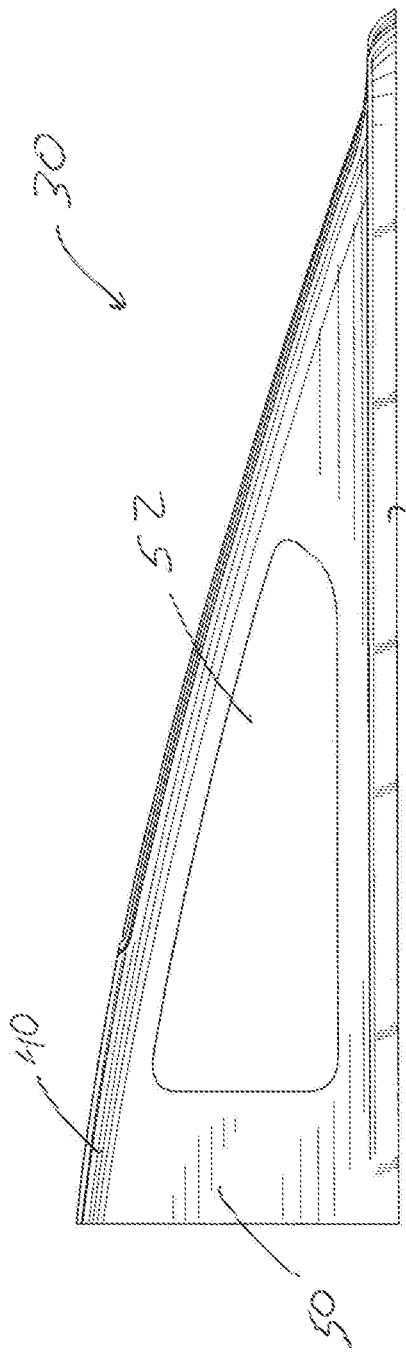
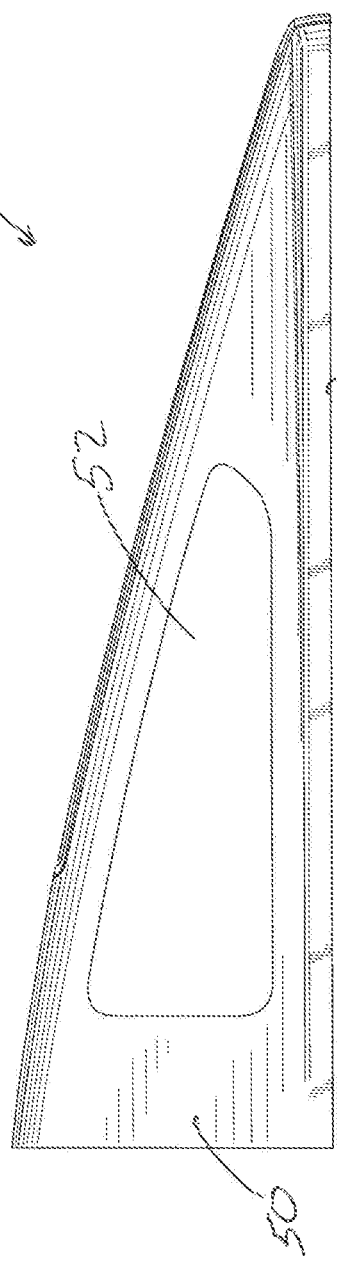

PICKUP TRUCK BED COVER

CROSS-REFERENCE TO RELATED APPLICATION

This application is a divisional of U.S. application Ser. No. 15/904,275, filed on Feb. 23, 2018. This application further claims the benefit of U.S. Provisional Application Nos. 62/463,439 filed on Feb. 24, 2017 and 62/521,590 filed on Jun. 19, 2017. The entire contents of which are incorporated herein by reference in their entirety.

BACKGROUND OF THE INVENTION

1. Field of the Invention

The present invention relates generally to pickup trucks and, more particularly, to bed covers for pickup trucks that are fuel efficient, aesthetically pleasing, and unique.

2. Related Art

A variety of devices are currently on the market for providing environmental and structural protection to a bed of a pickup truck. Some such devices include lightweight tonneau covers that are made of a canvas or vinyl type material and are stretched to engage with the truck's side rails to cover the bed. While useful, some may not consider such tonneau covers to be aesthetically pleasing, they severely limit what can be put in the bed, and they provide little in the way of security protection because they can be easily ripped or torn. To overcome the deficiencies with soft tonneau covers, manufacturers have developed had shell tonneau covers, such as flat fiberglass covers. While these overcome many of the issues with soft tonneau covers, they present issues of their own. More specifically, there is limited ability to lift open or store tall items. In addition, unlike soft tonneau covers, it is not recommended to travel in the truck with the hard cover open, which substantially limits the items that may be carried to only items that fit within the enclosed bed of the truck.

Another common device for covering the bed of a pickup truck is a bed cap. A typical bed cap has a boxy shape with four cap walls, one of which is typically a door or hatch that can be mounted on the truck's three bed walls and the tailgate. The cap walls extend upwardly to a generally flat roof to define an enclosure which extends from the floor of the bed to the roof of the cap. Such bed caps provide more structural and security protection to the bed by structurally enclosing it with a hard shell, and allow taller objects to be stored unlike tonneau covers. However, bed caps currently are very utilitarian in looks with their boxy shapes, and therefore, they are considered by some to be aesthetically unpleasing. Additionally, such bed caps are generally not aerodynamic, and thus, fitting a bed cover on a pickup truck may have a negatively impact on a truck's fuel economy.

There remains a continuing need for a structurally sound and aesthetically attractive option for covering the bed of a pickup truck that also allows for greater ability to store items than tonneau covers provide, and better fuel efficiency than traditional bed caps.

SUMMARY OF THE INVENTION AND ADVANTAGES

The present invention relates generally to pickup trucks and, more particularly, to a truck cap assembly for pickup trucks that are fuel efficient, aesthetically pleasing, and unique. The truck cap assembly is configured to be attached to the cargo hold of a pickup, the cargo hold having side rails, a front rail and a tailgate, and a horizontal bed extending therebetween and wherein the side rails are generally arranged parallel to a longitudinal axis of the pickup.

The truck cap assembly includes a stationary portion and a hatch member. The stationary portion is coupled to the cargo hold of the pickup, and includes a pair of opposing bed rail supports each having an inwardly extending portion and an outer lip, and a side wall extending upwardly from each bed rail support, and an upper cross member extending between each side wall, wherein each of the sidewalls, opposing bed rail supports and upper cross member define a hatch opening.

The hatch member is configured to fit within the hatch opening and has an upper edge, an inclined portion and a tail portion and the hatch member is configured to move between an open position and a closed position and wherein the hatch member is hingedly connected to at least one of the upper cross member and the side walls, and wherein the hatch member is configured to sealingly engage the upper cross member, the side walls in the closed position. The sidewalls extend upwardly and inwardly and wherein the inclined portion of the hatch member extends downwardly from the upper edge to the tail portion.

The hatch also sealingly engages a portion of each of the opposing bed rail supports. The inwardly extending portion includes an end lip and wherein the inwardly extending portion increases in width as the inwardly extending portion approaches the end lip. Each of the sidewalls may be curved, angled or extend inwardly toward each other as the sidewalls increase in height from the opposing bed rail supports. The inwardly extending portion includes an end lip and wherein each of the sidewalls is curved, angled or extends inwardly toward each other and is reduced in height as the sidewalls approach the end lip. A rear end wall extending between the sidewalls and the upper cross member and wherein the sidewalls extend from the rear end wall to the end lip on the inwardly extending portion but do not reach the end lip.

Each of the sidewalls may include a window, and the hatch member may include a window in the inclined portion.

The inclined portion may be at least partially covered by louvers, configured to extend substantially horizontally when the hatch member is in the closed position.

The hatch member includes an inclined portion and a tail portion extending therefrom and the tail portion may be angled relative to the inclined portion and ends in an outer lip.

The tail portion may include an intermediate portion between the inclined portion and the outer lip, or be formed without it.

The stationary portion includes an inner edge within a channel around the periphery of the hatch opening.

The hatch member may include a protrusion around its periphery on at least two sides configured to interface with the channel and a sealing member displaced between the hatch member and the stationary member.

The hatch member extends in a downward and rearward direction between the upper cross member and the tailgate and wherein the open position, the hatch member exposes an opening defined by the stationary portion.

In the open position the hatch member is approximately parallel with or angled upward away from the horizontal bed as the hatch member extends away from the upper cross member.

The hatch member is spaced from and extends over the horizontal bed between the tailgate and the upper cross member. This is unusual and required special hinges and bracing not normal in truck caps.

The horizontal bed has a length along the longitudinal axis and the hatch member extends along the longitudinal axis for the majority of the length, but does not extend for the whole length.

The hatch member has an inclined portion including a hatch window and wherein the hatch window is arranged to be more parallel to the horizontal truck bed than perpendicular to the horizontal truck bed.

Each sidewall includes a side window and wherein the side window has a front edge and an opposing rear edge and bottom edge and an upper edge and wherein the sidewalls are configured so that the rear edge is disposed closer to the tailgate than the front edge and wherein the rear edge is displaced inward toward the longitudinal axis relative to the front edge and wherein the upper edge is displaced inward toward the longitudinal axis relative to the lower edge.

The hatch member has an inclined portion including a hatch window and wherein the hatch window is inclined less than 50 degrees, preferably less than 40 degrees and more preferably less than 30 degrees and more than 10 degrees from a plane formed by the horizontal bed as it extends upwardly away from the tailgate, and wherein the side windows are each inclined more than 50 degrees, but less than 90 degrees relative to the plane formed by the horizontal bed. In fact, it has been found that 15 to 25 degrees, preferably about 20 degrees gives the most pleasing look on a five and a half foot or six and a half foot length bed.

A hinge assembly operably connecting the hatch member with the stationary portion allows the hatch member to move between the open and closed positions; and wherein the hinge assembly includes a pair of hinges each being generally question mark-shaped for allowing a back edge of the hatch member to raise above the an adjacent portion of the stationary piece for guiding rain water away from the opening when the hatch member is in the open position and for preventing interference between the hatch member and the stationary piece when the hatch member is moved between the open and closed positions.

At least one of the stationary portion and the hatch member include an edge channel and the other of the stationary portion and the hatch includes a protrusion configured to fit within the edge channel and when the hatch member is in the closed position, the a sealing member coupled to one of the stationary portion and the hatch member is in sealing contact with the other of the hatch member and the stationary portion.

The edge channel is located on the stationary portion and the truck cap assembly further includes a drain channel configured to sealing engage the edge channel and divert water from entering the cargo hold and wherein the drain channel includes a channel extending between an opening and an outlet.

The channel on the drain channel is an internal channel extending between an opening and an outlet and wherein the outlet is proximate the sidewalls of the pickup.

A truck cap assembly configured to be attached to the cargo hold of a pickup, the cargo hold having side rails, a front rail and a tailgate, and a horizontal bed extending therebetween and wherein the side rails are generally arranged parallel to a longitudinal axis of the pickup. The truck cap assembly includes a stationary portion which is fixable with a the side rails of the cargo hold and wherein the stationary portion defines a hatch opening; a hatch member operably connected with the stationary piece and selectively movable relative to the stationary portion between an open position which exposes the hatch opening in the stationary portion and a closed position wherein the hatch member covers the hatch opening; a pair of hinges operably connecting the hatch member with the stationary portion and allowing the hatch member to move between the open and closed positions; and each of the hinges being generally question mark-shaped for allowing a back edge of the hatch member to raise above the an adjacent portion of the stationary piece for guiding rain water away from the opening when the hatch member is in the open position and for preventing interference between the hatch member and the stationary piece when the hatch member is moved between the open and closed positions.

The stationary portion includes a pair of opposing bed rail supports each having an inwardly extending portion and an outer lip, and a side wall extending upwardly from each bed rail support, and an upper cross member extending between each side wall, wherein each of the sidewalls, opposing bed rail supports and upper cross member define a hatch opening, and the hatch member having an upper edge, an inclined portion and a tail portion; and wherein the stationary member includes opposing sidewalls extending upwardly and inwardly and wherein the inclined portion of the hatch member extends downwardly from the upper edge to the tail portion.

The inwardly extending portion includes an end lip and wherein the inwardly extending portion increases in width as the inwardly extending portion approaches the end lip, and wherein each of the sidewalls is curved inwardly toward each other and is reduced in height as the sidewalls approach the end lip.

The sidewalls extend inwardly toward each other as the sidewalls increase in height from the opposing bed rail supports, and further wherein the truck cap assembly includes a rear end wall extending between the sidewalls and the upper cross member and wherein the sidewalls extend from the rear end wall to the end lip on the inwardly extending portion but do not reach the end lip.

Each of the sidewalls may include a window and the hatch member may include a window in the inclined portion. Other windows may be added or removed as desired.

The inclined portion may be at least partially covered by louvers, configured to extend substantially horizontally when the hatch member is in the closed position.

The hatch member includes an inclined portion and a tail portion extending therefrom and wherein the tail portion is angled relative to the inclined portion and ends in an outer lip, and wherein the tail portion includes an intermediate portion between the inclined portion and the outer lip that extends beyond the tailgate and over the horizontal bed.

The stationary portion includes an inner edge around the periphery of the hatch opening and wherein the inner edge includes an edge channel.

A drain channel 15 configured to prevent water in the edge channel from entering the cargo hold by diverting water through a channel from an opening engaging the edge channel to an outlet proximate the side walls of the pickup.

A support plane is formed by the lower surfaces of the opposing bed rail supports, rear end wall, and tail portion. In the open position the hatch member is parallel with or angled upward away from the support plane as the hatch member extends away from the upper cross member and wherein the hatch member is spaced from and extends over the support plane between the tailgate and the upper cross member and wherein the truck cap assembly has a length along the longitudinal axis of pickup and wherein the hatch member extends along the longitudinal axis for the majority of the length, but does not extend for the whole length.

The hatch member has an inclined portion including a hatch window and wherein the hatch window is arranged to be more parallel to the support plane than perpendicular to the support plane.

Each sidewall may include a side window and wherein the side window has a front edge and an opposing rear edge and bottom edge and an upper edge and wherein the sidewalls are configured so that the rear edge is disposed closer to the tailgate than the front edge and wherein the rear edge is displaced inward toward the longitudinal axis relative to the front edge and wherein the upper edge is displaced inward toward the longitudinal axis relative to the lower edge.

The hatch member may have an inclined portion including a hatch window and wherein the hatch window is inclined less than 40 degrees, preferably less than 30 degrees, typically 15-25 degrees, and about 20 degrees in the illustrated Figures from the support plane and wherein the side windows are each inclined more than 50 degrees, but less than 90 degrees relative to the support plane.

At least one of the stationary portion and the hatch member include an edge channel and the other of the stationary portion and the hatch includes a protrusion configured to fit within the edge channel and when the hatch member is in the closed position, the a sealing member coupled to one of the stationary portion and the hatch member is in sealing contact with the other of the hatch member and the stationary portion The edge channel is located on the stationary portion and the truck cap assembly further includes a drain channel configured to sealing engage the edge channel and divert water from entering the cargo hold and wherein the drain channel includes a channel extending between an opening and an outlet and wherein the outlet is proximate the sidewalls of the pickup, typically engaging a support member for the sidewalls.

A truck cap assembly configured to be attached to the cargo hold of a pickup, the cargo hold having side rails, a front rail and a tailgate, and a horizontal bed extending therebetween and wherein the side rails are generally arranged parallel to a longitudinal axis of the pickup, the truck cap assembly comprising:

a stationary portion which is fixable with the side rails of the cargo hold and wherein the stationary portion defines a hatch opening; a hatch member operably connected with the stationary piece and selectively movable relative to the stationary portion between an open position which exposes the hatch opening in the stationary portion and a closed position wherein the hatch member covers the hatch opening; the stationary portion having an edge channel and wherein one of the match member and the stationary portion is coupled to at least one sealing member extending along the periphery of the inner edge of the hatch member of inner edge of the stationary portion; and when the hatch member is in the closed position, the sealing member of the stationary portion being in sealing contact with the channel and the sealing member being in sealing contact between the hatch member and the stationary portion.

A pair of hinges operably connecting the hatch member with the stationary portion and allowing the hatch member to move between the open and closed positions; and each of the hinges being generally question mark-shaped for allowing a back edge of the hatch member to raise above the an adjacent portion of the stationary piece for guiding rain water away from the opening when the hatch member is in the open position and for preventing interference between the hatch member and the stationary piece when the hatch member is moved between the open and closed positions.

The stationary portion includes a pair of opposing bed rail supports each having an inwardly extending portion and an outer lip, and a side wall extending upwardly from each bed rail support, and an upper cross member extending between each side wall, wherein each of the sidewalls, opposing bed rail supports and upper cross member define a hatch opening, and the hatch member having an upper edge, an inclined portion and a tail portion; and wherein the stationary member includes opposing sidewalls extending upwardly and inwardly and wherein the inclined portion of the hatch member extends downwardly from the upper edge to the tail portion.

The inwardly extending portion includes an end lip and wherein the inwardly extending portion increases in width as the inwardly extending portion approaches the end lip, and wherein each of the sidewalls is curved inwardly toward each other and is reduced in height as the sidewalls approach the end lip.

Each of the sidewalls is curved, angled or extends inwardly toward each other as the sidewalls increase in height from the opposing bed rail supports, and further wherein the truck cap assembly includes a rear end wall extending between the sidewalls and the upper cross member and wherein the sidewalls extend from the rear end wall to the end lip on the inwardly extending portion but do not reach the end lip.

The hatch member includes an inclined portion and a tail portion extending therefrom and wherein the tail portion is angled relative to the inclined portion and ends in an outer lip, and wherein the tail portion includes an intermediate portion between the inclined portion and the outer lip that extends beyond the tailgate and over the horizontal bed.

The support plane formed by the lower surfaces of the opposing bed rail supports, rear end wall, and tail portion wherein in the open position the hatch member is parallel with or angled upward away from the support plane as the hatch member extends away from the upper cross member and wherein the hatch member is spaced from and extends over the support plane between the tailgate and the upper cross member and wherein the truck cap assembly has a length along the longitudinal axis of pickup and wherein the hatch member extends along the longitudinal axis for the majority of the length, but does not extend for the whole length.

The hatch member has an inclined portion including a hatch window and wherein the hatch window is arranged to be more parallel to the support plane than perpendicular to the support plane.

Each sidewall includes a side window and wherein the side window has a front edge and an opposing rear edge and bottom edge and an upper edge and wherein the sidewalls are configured so that the rear edge is disposed closer to the tailgate than the front edge and wherein the rear edge is displaced inward toward the longitudinal axis relative to the front edge and wherein the upper edge is displaced inward toward the longitudinal axis relative to the lower edge.

The hatch member has an inclined portion including a hatch window and wherein the hatch window is inclined 15-20 degrees from the support plane and wherein the side windows are each inclined more than 50 degrees, but less than 90 degrees relative to the support plane.

The inclined portion may include a transparent panel and a tail portion with a generally flat surface which extends in a horizontal plane and which has a generally trapezoidal shape.

The stationary portion may further include an edge channel and engage a drain channel member to divert water from the edge channel out of the cargo hold.

The drain channel may include a channel extending between an opening and an outlet and wherein the opening engages the edge channel and wherein the outlet is proximate to the side rails and wherein the drain channel includes a horizontal portion and a vertical portion and wherein vertical portion includes a bed engagement portion configured to have a mirror image contour to a side wall contour and wherein the horizontal portion and vertical portions meet at a bed rail cutout.

The channel may be substantially internal to the horizontal and vertical portions and wherein the horizontal portion includes a horizontal axis and the vertical portion includes a vertical axis and wherein the horizontal axis is arranged approximately perpendicular to the vertical axis.

A truck cap assembly, including a stationary portion which is fixable with a the side walls of a pickup bed and which has an opening; a hatch member operably connected with the stationary portion and selectively movable relative to the stationary portion between an open position which exposes the opening in the stationary portion and a closed position wherein the hatch member covers the opening; and the hatch member having an inclined portion with a glass panel and a tail portion with a generally flat surface which extends in a horizontal plane and which has a generally trapezoidal shape.

A drain channel member for a truck cap assembly configured to fit over the cargo hold of a pickup and wherein the cargo hold of the pickup includes a horizontal bed, opposing sidewalls, a rear end and a pivotable tailgate, and wherein the sidewalls include a structural support having a support contour and wherein the drain channel member for a truck cap assembly including a horizontal portion including an opening and a vertical portion having a sidewall engagement portion configured to engage the structural support and wherein the sidewall engagement portion has a contour that is substantially a mirror image of the support contour.

The drain channel member for a truck cap assembly wherein the vertical portion includes an outlet and a channel extends between the opening on the horizontal portion to the outlet.

The drain channel member for a truck cap assembly wherein the truck cap assembly includes a stationary portion and a hatch me member and the stationary portion includes an edge channel configured to engage the opening on the drain channel member.

BRIEF DESCRIPTION OF THE FIGURES

These and other features and advantages of the present invention will be readily appreciated, as the same becomes better understood by reference to the following detailed description when considered in connection with the accompanying drawings wherein:

FIG. 7 is a left elevational view of the truck cap assembly in FIG. 4.

FIG. 8 is a left elevational view of an exemplary truck cap assembly.

DESCRIPTION OF THE ENABLING EMBODIMENT

Figure 1:
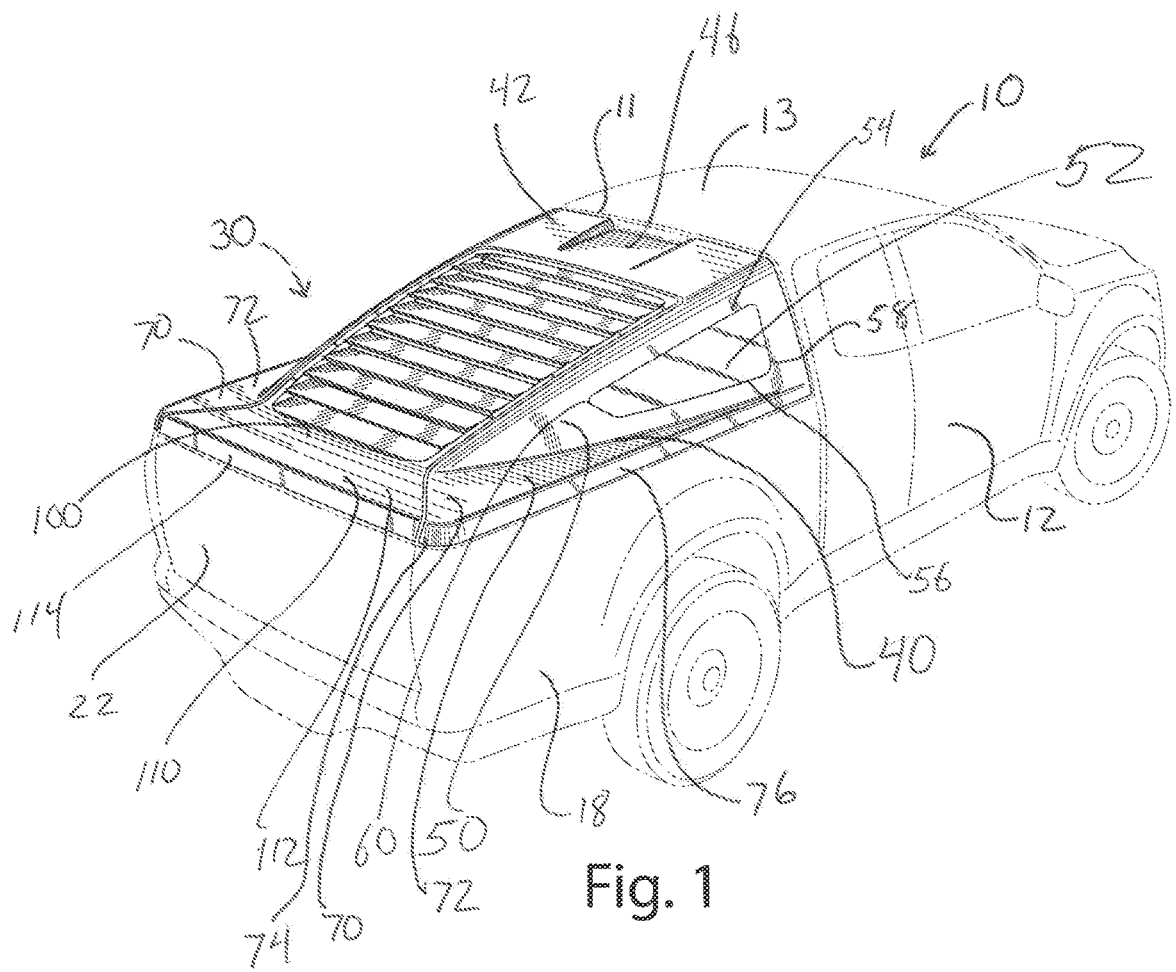
FIG. 1 is a rear perspective view of a truck cap assembly, coupled to an exemplary truck shown in phantom lines.
Figure 2:
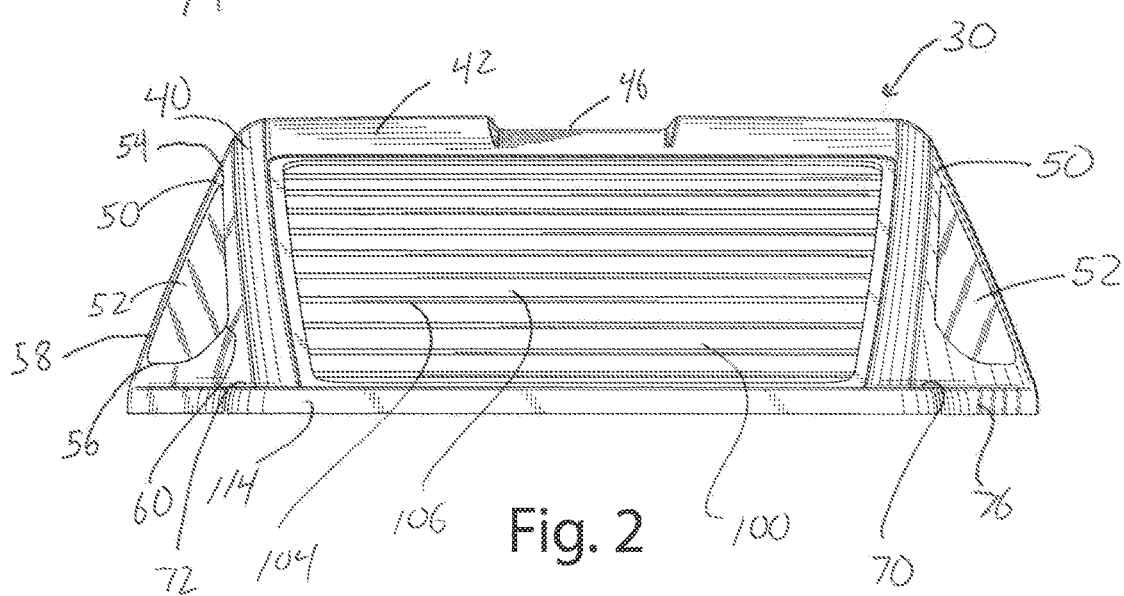
FIG. 2 is a rear elevational view of the truck cap assembly.

Referring to the Figures, wherein like numerals indicate corresponding parts throughout the several views, an exemplary embodiment of a pickup truck 10 with an improved bed cover assembly 30 is generally shown in FIG. 1. FIG. 1 also shows a typical pickup truck 10 having a cab 12 and a cargo hold 14 having a horizontal bed 16 and opposing sidewalls 18, 20 extending upwardly therefrom. A rear end wall 19 extends upwardly proximate to the cab and extends between the bed walls 18, 20. A pivotable tailgate, shown in the figures in both the open position and closed position, extends between the bed walls 18, 20 at the opposing end of the horizontal bed from the rear end wall 19. The horizontal bed 16, opposing sidewalls 18, 20, rear end wall 19 and pivotable tailgate 22 all cooperate to define an interior cargo space 24, into which cargo is typically placed. The upper surfaces of the side walls 18, 20, rear end wall 19, and tailgate 22 all include upper surfaces 23 configured to support the bed cover assembly 30. The bed cover assembly 30 is also secured to the cargo hold 14, typically the sidewalls 18, 20. Without a bed cover assembly 30, the defined interior space 24 is unsecure and accessible by anyone passing by and during transit, light items may blow out of the bed. When attached, the bed cover assembly 30 increases the defined interior space that is secure and available for storage of items.

As shown, the bed cover assembly 30 entirely covers the pickup's cargo hold 14 and extends at a downward and rearward extending angle, from a rear edge 11 of a roofline 13 of the pickup 10 to a top edge 23 of a tailgate 22. In addition to giving the vehicle a unique and sporty appearance, the angle of the hatch member also improves the vehicle's aerodynamic shape, thereby increasing fuel economy. In addition, the shape of the cap assembly 10 has the hatch member 100 extending over the majority of the horizontal bed 16. The hatch member 100 also extends across the majority of the lateral width of horizontal bed 16.

The bed cover assembly 30 generally includes a stationary portion 40 affixed to the cargo hold 14 of the pickup 10 and a moveable hatch member 100. The stationary portion 40 has sidewalls 50 extending upward from bed rail supports 70 on opposing sides. A cross member 32 extends between the sidewalls and a rear end wall 80 extends therebetween. The lower surfaces of the bed rail support 70, rear end wall 80, and in the closed position the tailgate, where they engage the sidewalls 18, 20, rear end 19 and pivotable tailgate generally form a support plane 78. The stationary portion 40 is generally clamped to the sidewalls by any known method.

The upper cross member 40 may have a brake light recess 46 contoured out of the cross member 40 to allow the high mount brake light on the cab 12 to be visible, or the cross member may be formed with no or minimal recess and an extra high mount brake light 48 may be included. Power may be provided to the bed cover assembly to power stereos, chargers and power lift gates as well as provide outlets for other devices.

Figure 4:
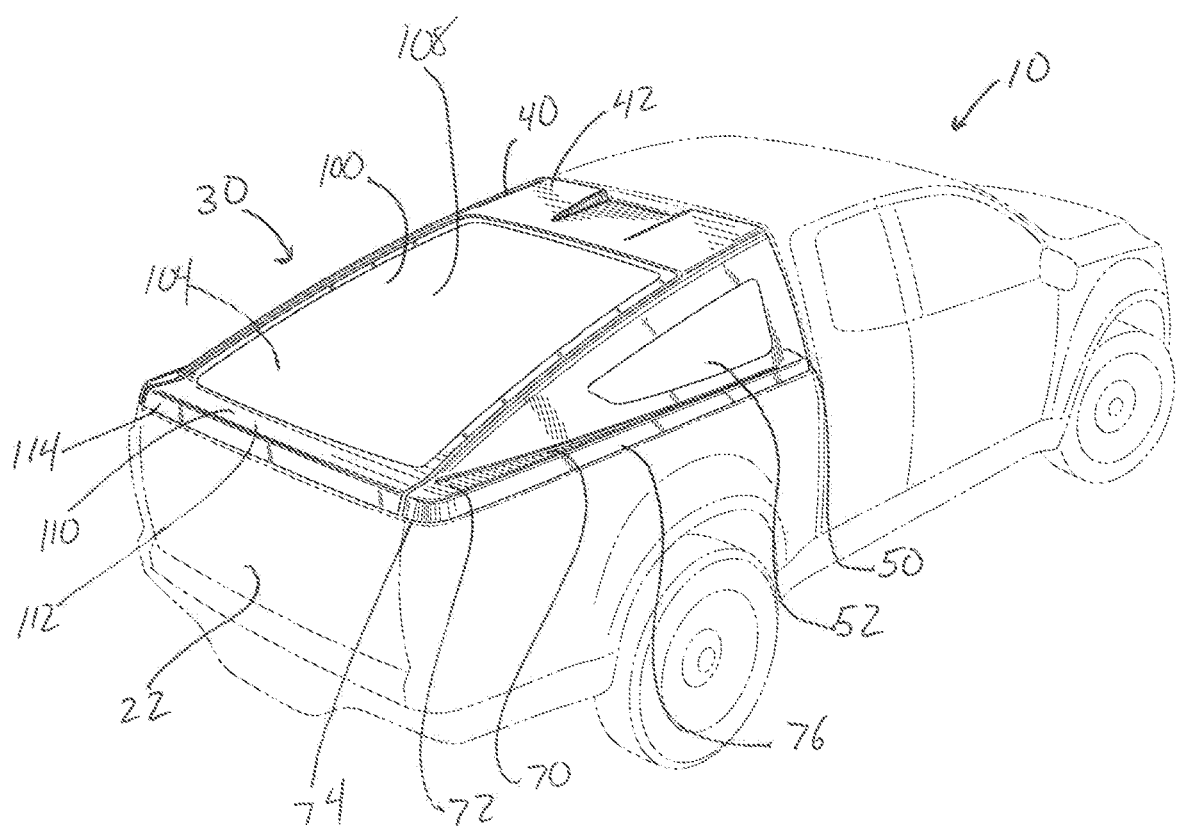
FIG. 4 is a second rear perspective view of the truck cap assembly.
Figure 5:
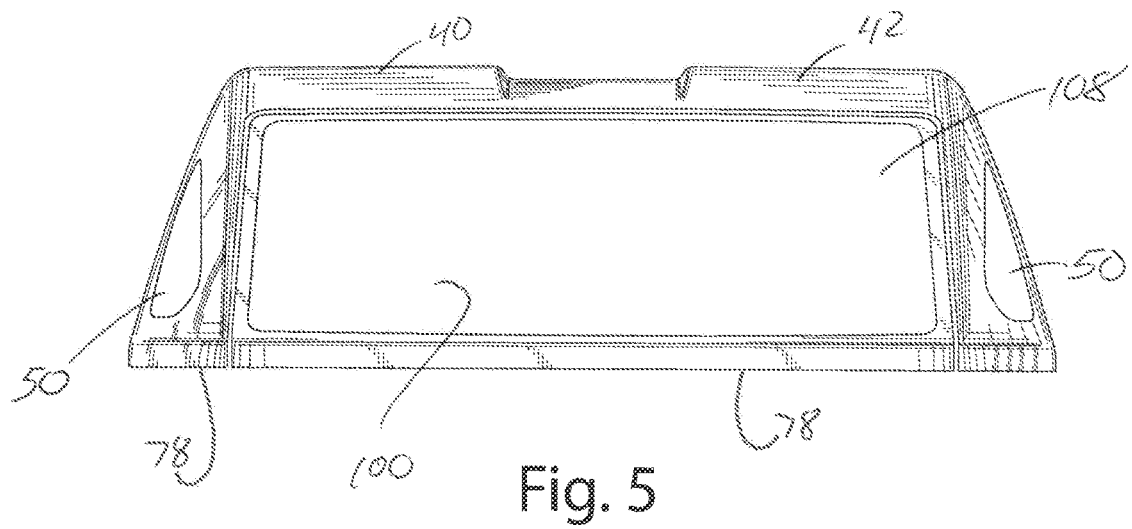
FIG. 5 is a rear elevational view of the truck cap assembly in FIG. 4.
Figure 6:
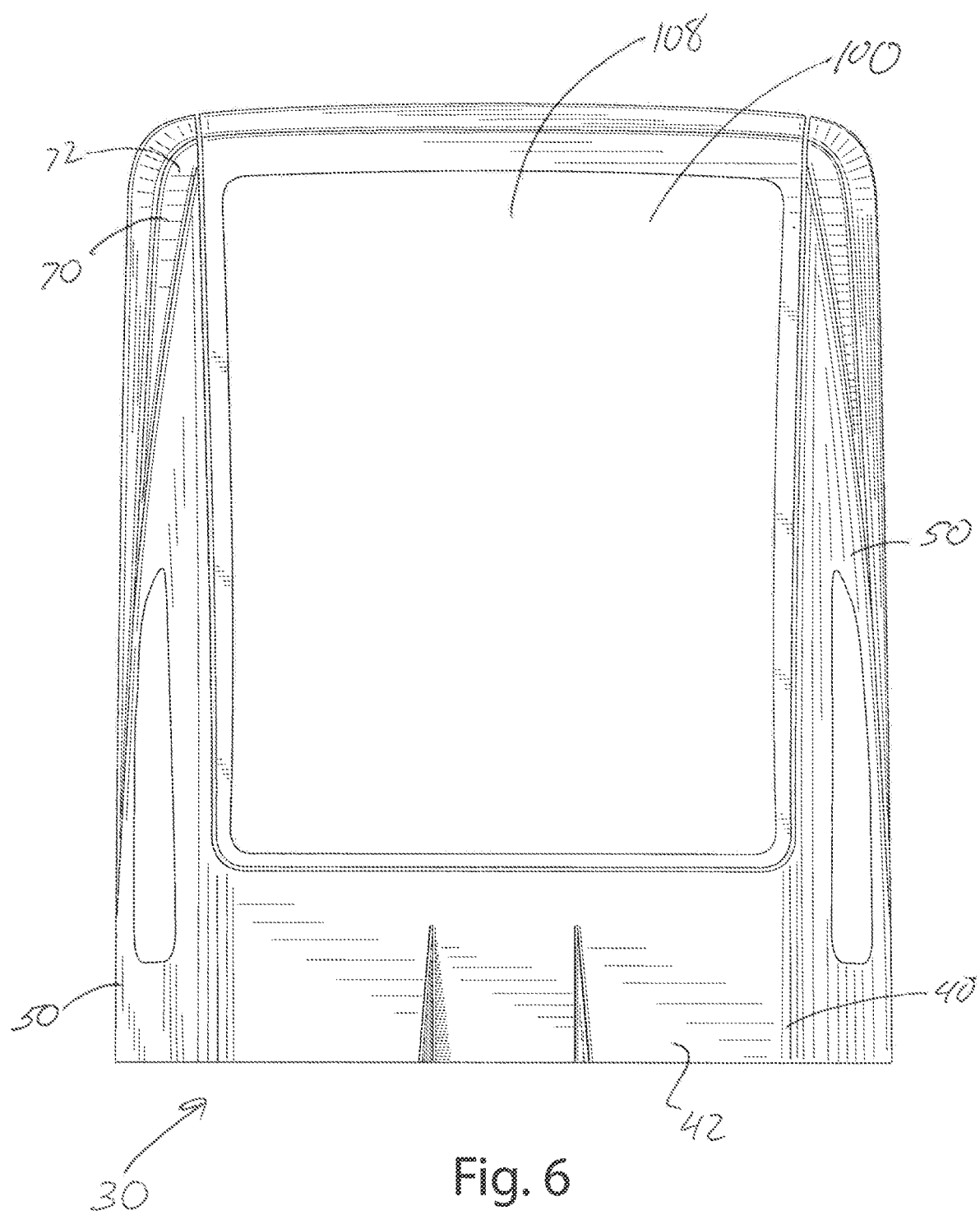
FIG. 6 is a top plan view of the truck cap assembly in FIG. 4.
Figure 9:
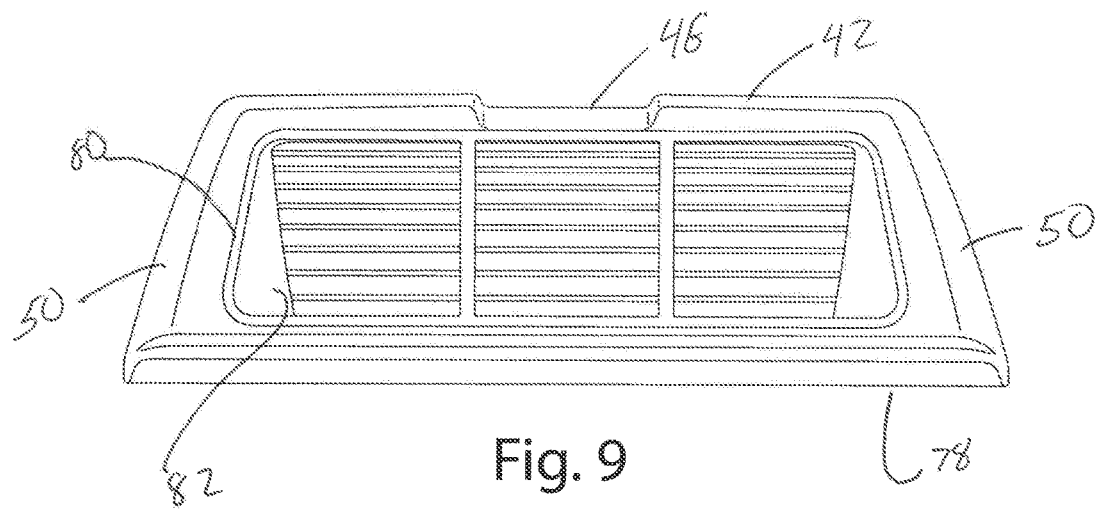
FIG. 9 is an external view of the rear wall of the truck cap assembly.
Figure 10:
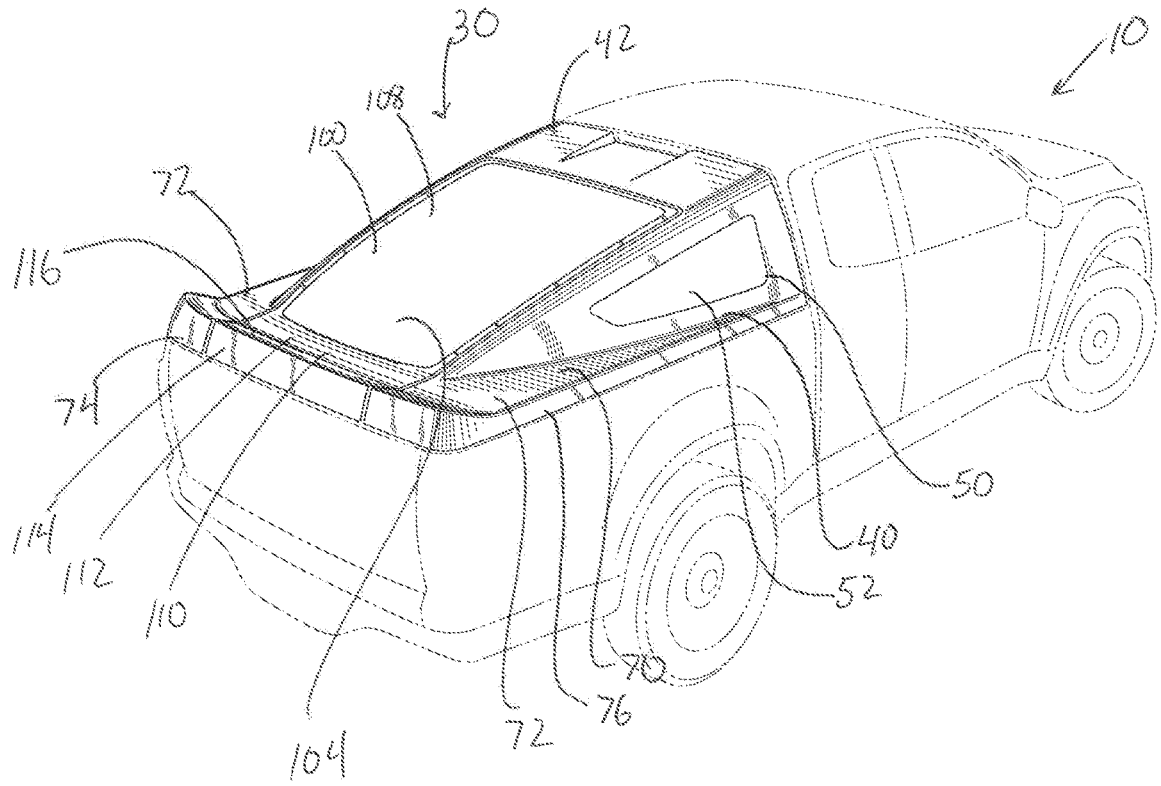
FIG. 10 is a rear perspective view of an exemplary truck cap assembly.
Figure 11:
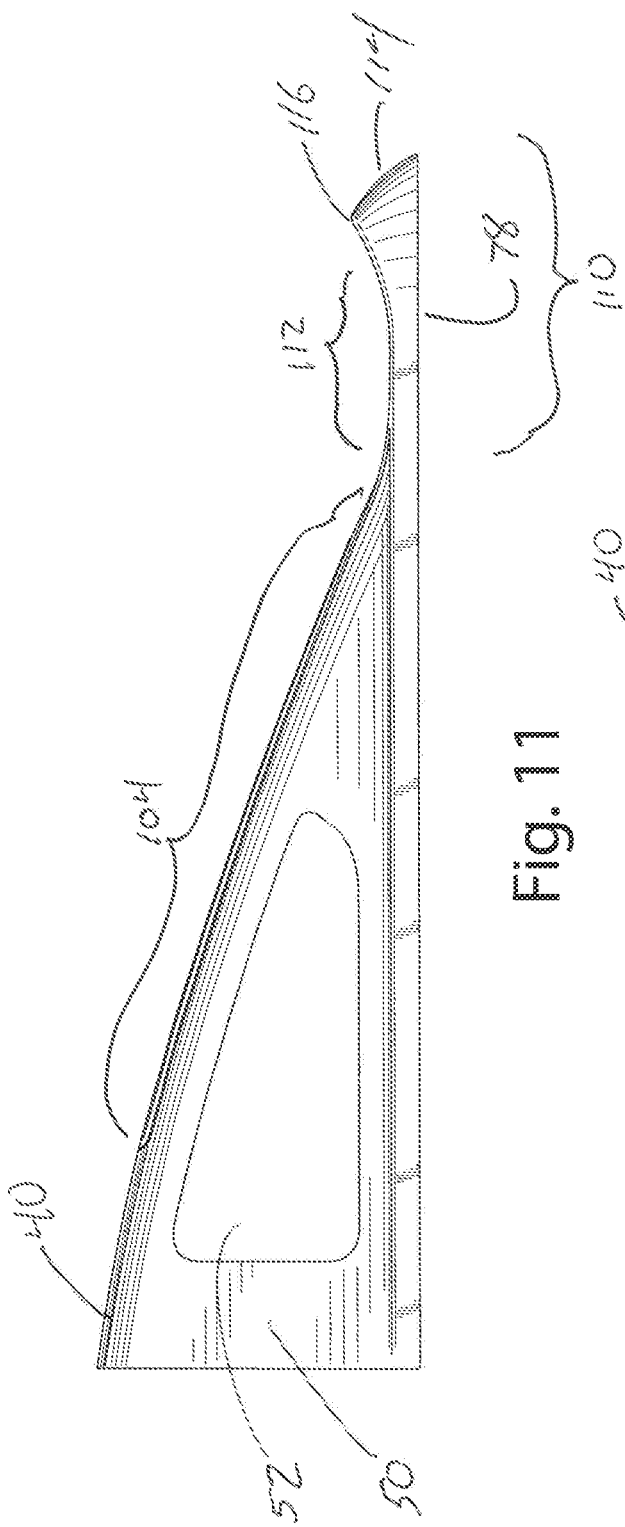
FIG. 11 is a left elevational view of the truck cap assembly in FIG. 10.
Figure 12:
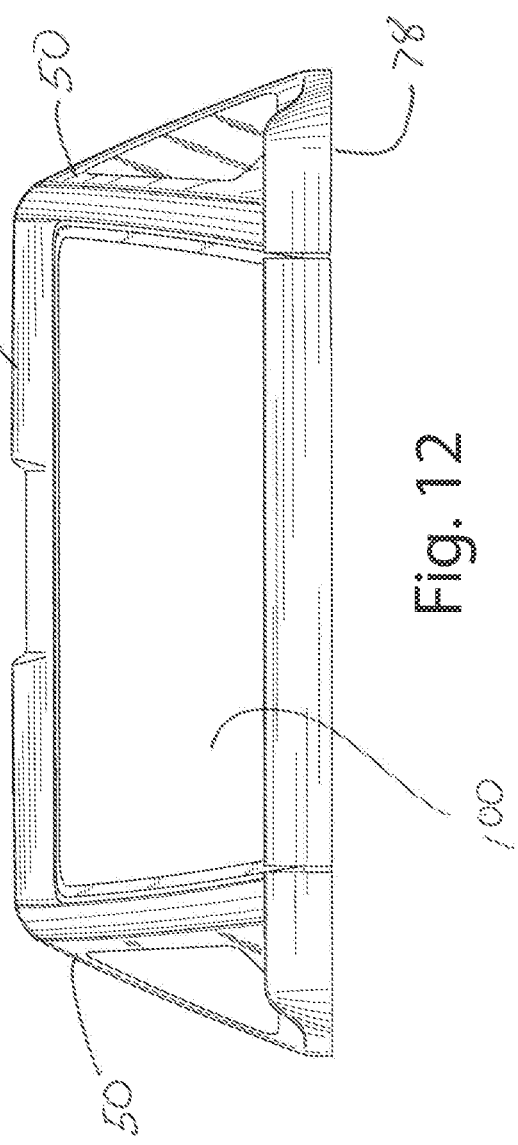
FIG. 12 is a rear elevational view of the truck cap assembly in FIG. 10.
Figure 13:
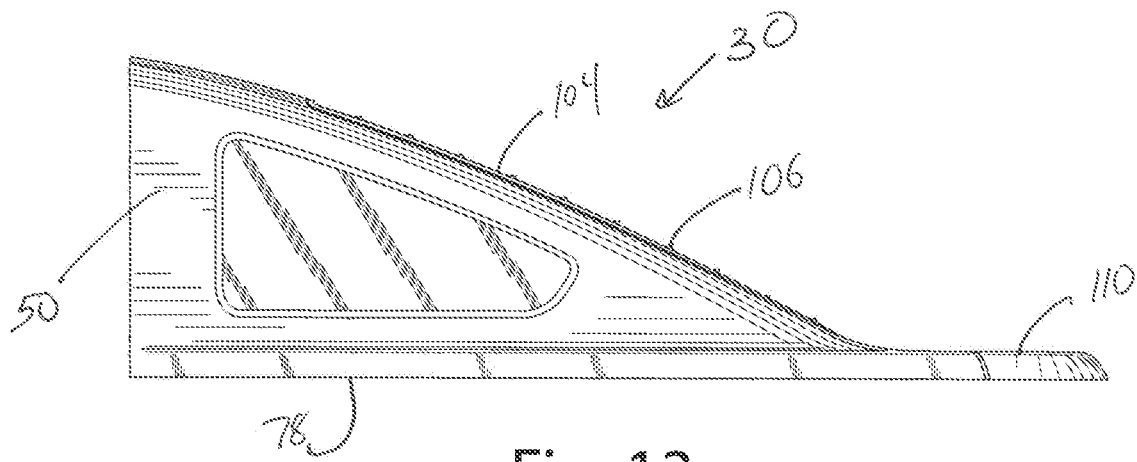
FIG. 13 is a left elevational view of an exemplary truck cap assembly.
Figure 14:
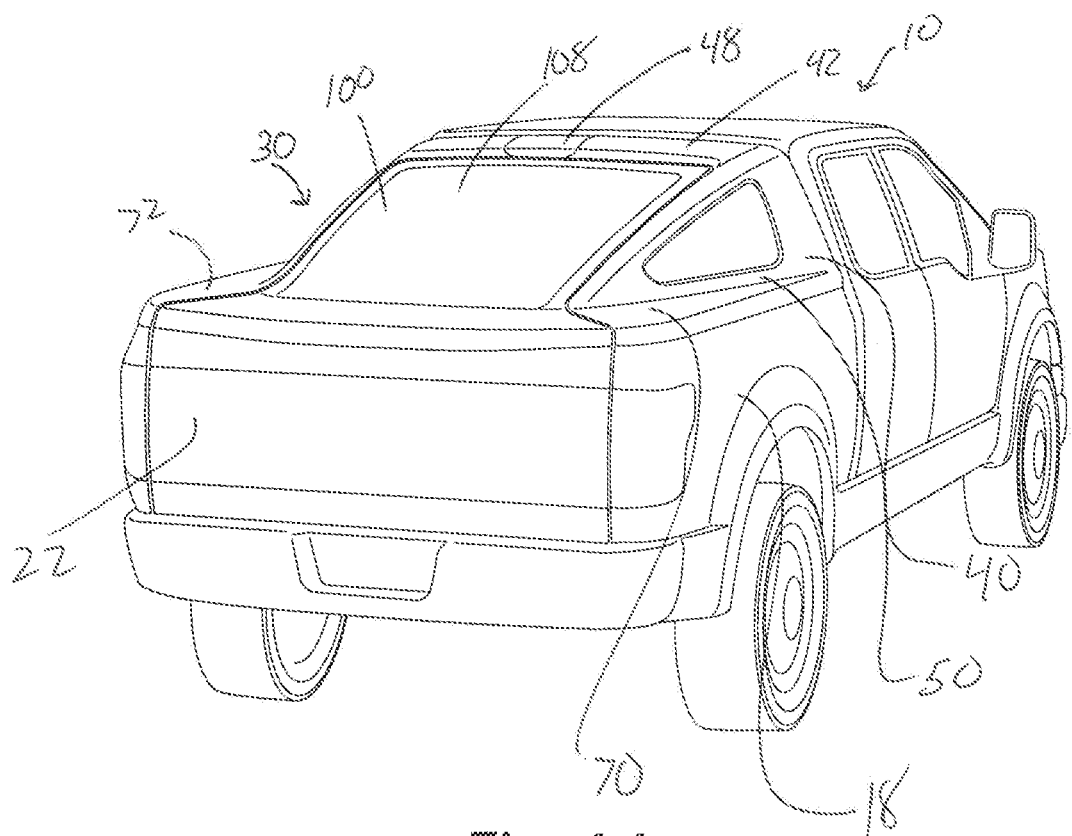
FIG. 14 is a rear perspective view of an exemplary truck cap assembly in the closed position.

The sidewalls 50 generally extend inwardly as they extend upwardly from the bed rail support, and in addition, the sidewalls 50 also generally extend inwardly as they extend from being proximate to the rear end wall 80 toward the end lip 74 on the bed rail support. The bed rail supports may vary in width and length depending on the styling and length of the cargo area. For example, FIG. 1 is illustrated on a six and a half foot in length bed, FIG. 11 is illustrated on a full 8 foot bed, and while FIG. 13 is configured for a five and a half foot bed. All of these are approximate, however the slope of the incline, shape of the exterior walls can change to fit other size beds, and the length of the tail, illustrated as longer in FIGS. 13 and 11, shorter in FIGS. 4 and 7 and almost nonexistent in FIG. 8 may also be chosen on desired styling preferences. Furthermore the shape of the tail cap assembly, particularly the sidewalls 50, inwardly extending portions and match member 100, particularly the tail portion 110 may vary. For example, a more aggressive slope to the inclined portion 104 of the hatch member 100 and inward rake of the sidewalls 50 can create a tail portion 110 that extends outward in the intermediate portion 112 toward the outer lip, as illustrated with the gap line between the hatch member 100 and the stationary portion 40. In comparison, FIGS. 4-6 show a much straighter sidewall that rises more vertically and extends back with less of a rake inward toward the tailgate, and the gap between the hatch member 100 and the stationary portion 40 is a more straight line.

The sidewalls may include optional windows 52, which may include or be covered as well by louvers (not illustrated). The compound angle of the sidewalls 50, specifically angled inwardly as they extend upward and inward as they approach the tailgate 22 may also carry through to the windows 52 being angled as well. For example, the rear edge 60 of the window 52 may be further inward or closer to the opposing window or sidewall 50 than the front edge 58. Likewise the top edge or upper edge 54 may be further inward or closer to the opposing sidewall 50 than the lower edge 56. As illustrated in FIG. 1, the sidewalls may have a curved styling or in other figures be straighter and substantially without curve.

The bed rail supports 70 are configured to rest on and be secured to the sidewalls 18, 20 of the cargo hold 14. Any method of attachment that secures the cap assembly 30 or bed cover assembly 30 is acceptable. The bed rail supports include an inwardly extending portion whose size may vary with styling considerations as well as length of the cargo hold 14 on which the bed is being placed. A large inwardly extending portion is illustrated in FIG. 1 that substantially increases in size as it approaches the tailgate 22, while FIG. 6 illustrates a small area, with the sidewall taking up the bulk of the bed rail support area. The bed rail supports 70 each include an outer lip extending from the front to the back of the cargo hold 14 and end in an end lip aligned generally with the tailgate 22 exterior surface.

Figure 19:
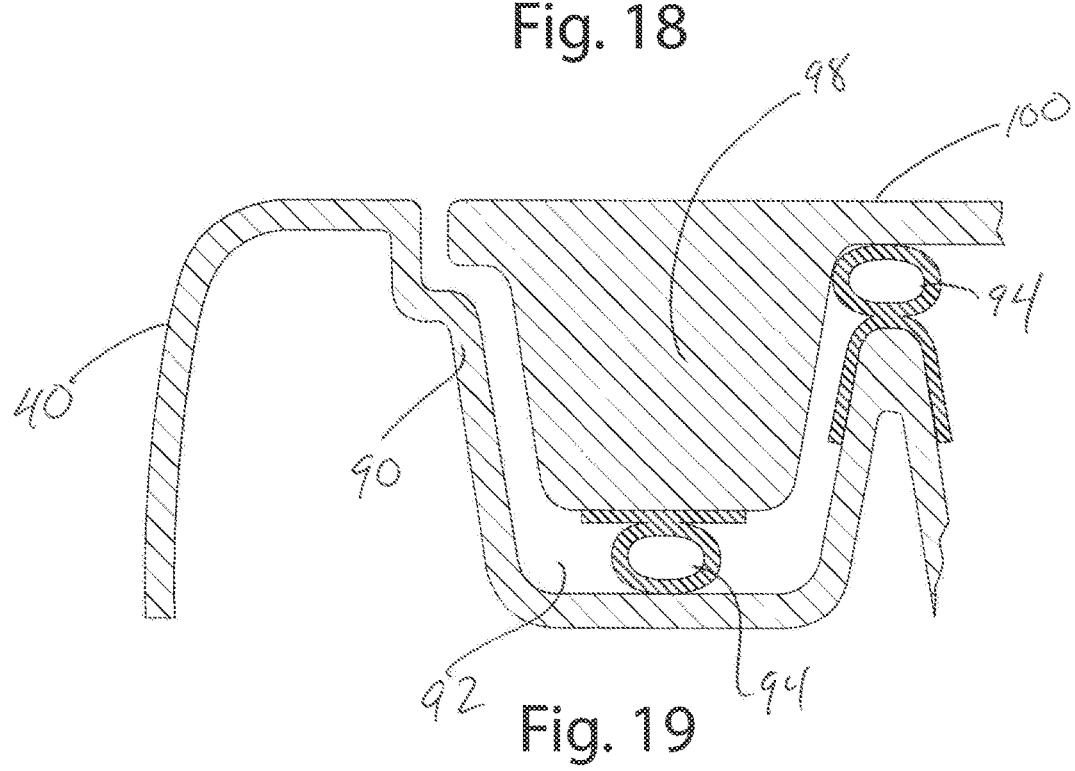
FIG. 19 is a cross-sectional view of the edge channel and seal between the hatch member and the stationary portion.

The stationary portion 40 defines with the sidewalls, and to some extend the inwardly extending portion 72 an inner edge 90. The inner edge 90 is illustrated to have channels 92 to assist with sealing against water entry and to channel water to the drain channel further escribed below. Of course the cap assembly 10 may be formed with a channel that directly interfaces in a manner to ensure water does not enter the cargo hold 14 and eliminate the need for a second separate member to be installed. At least one seal 94 is proximate to or in the channel as illustrated in FIG. 19. The hatch member 100 may include a protrusion 98 to fit within the channel. The style and shape of the seal 94 and edge channel 92 as well as the protrusion 98 on the hatch member are exemplary and may change in size, shape and configuration.

The hatch member 100 is coupled with a hinge assembly 120 to the stationary portion 40, typically either the sidewalls 50 or the cross member 42. The hatch assembly 100 and upper cross member, or stationary portion may include a second layer concealing the bulk of the hinge assembly 120. The hinges 122 are formed as question marks to allow the unique opening of the hatch member 100 relative to the stationary portion 40. The stationary portion may include frame members that extend between the hinges and in some embodiments along the sidewalls 50, however, in many instances the structure of the cap assembly is rigid enough without additional metal frames. Likewise the hatch member may include frame members extending between the hinges 122, as well in some instances around the window opening or even to the tail portion 110. A left lift support 124 may extend between the hatch member 100 and the stationary portion 40.

The hatch member 100 includes an inclined portion which may include a window 108 formed of a transparent material such as glass, polycarbonate, Plexiglas, Lexan or some other material. The window 108 may be covered by louvers 106 for styling. The hatch member 100 ends in a tail portion which may have a variety of sizes, shapes and configurations and may even include an upturned portion 116 at the outer lip 114 to improve fuel economy or improve styling cues, or even add a little downforce. An intermediate portion 112 extends between the inclined portion and the outer lip on the tail portion 110. Of course in some embodiments, as illustrated, the intermediate portion may be absent with the inclined portion ending in the outer lip of the tail portion 110.

Figure 15:
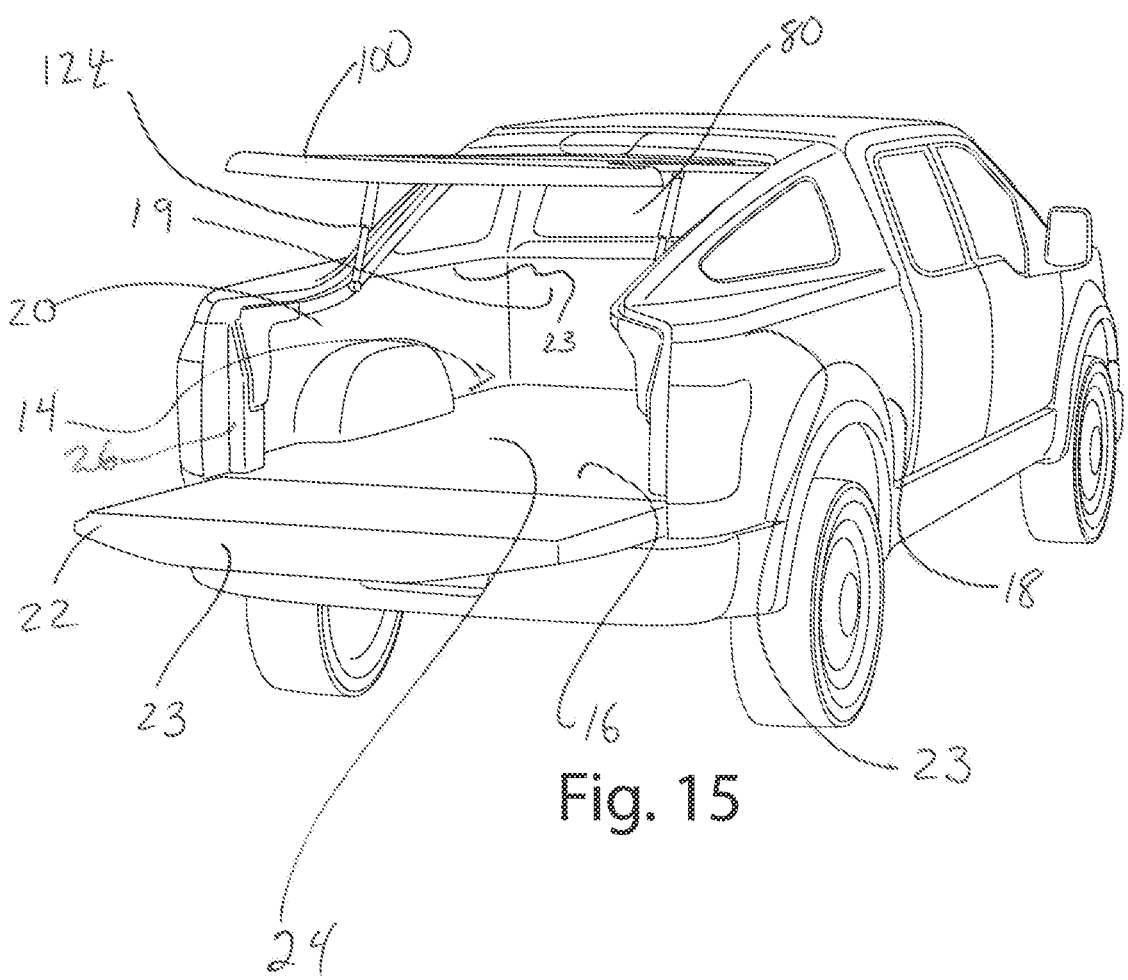
FIG. 15 is a rear perspective view of an exemplary truck cap assembly in the open position.
Figure 16:
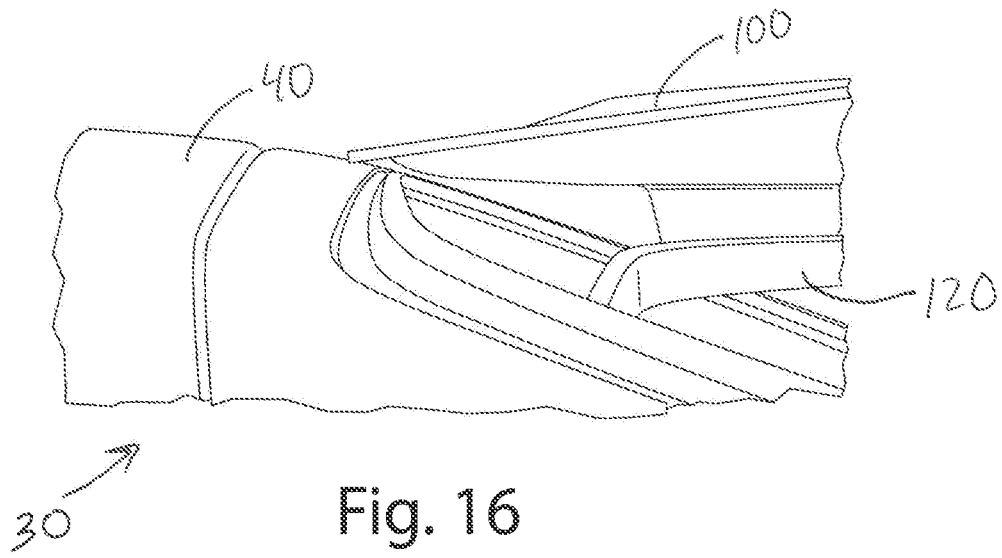
FIG. 16 is an enlarged left side elevational view in the open position showing the interface of the stationary portion and the hatch member.
Figure 17:
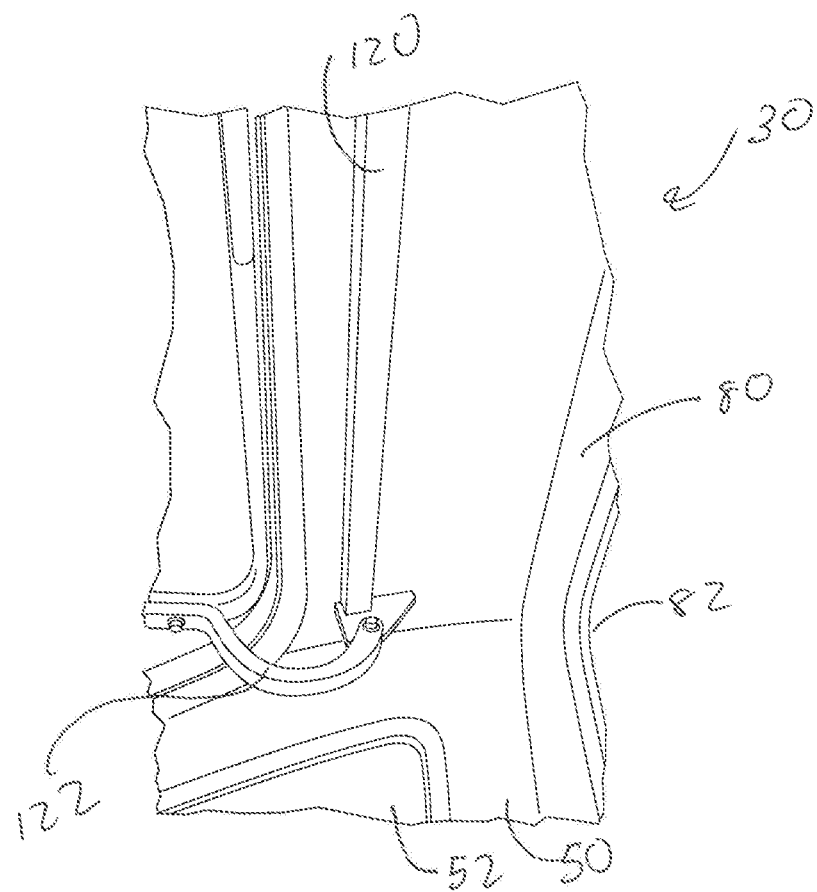
FIG. 17 is an underside view of the inside hatch and cap frame showing the hinges.
Figure 18:
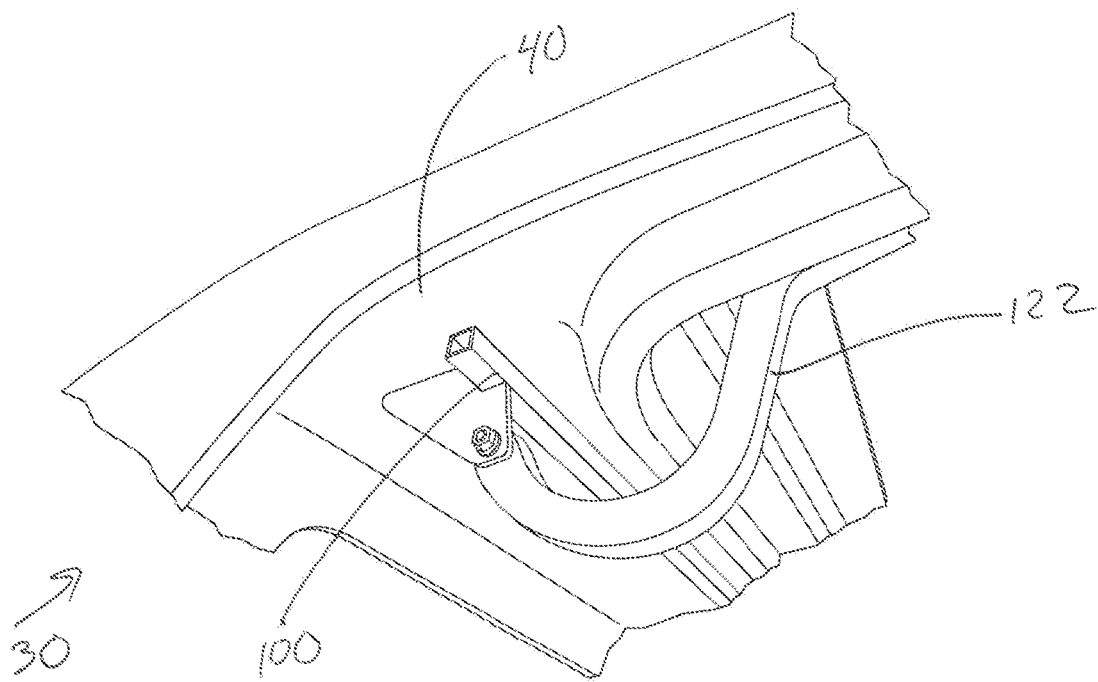
FIG. 18 is a bottom perspective view of the hinges.
Figure 20:
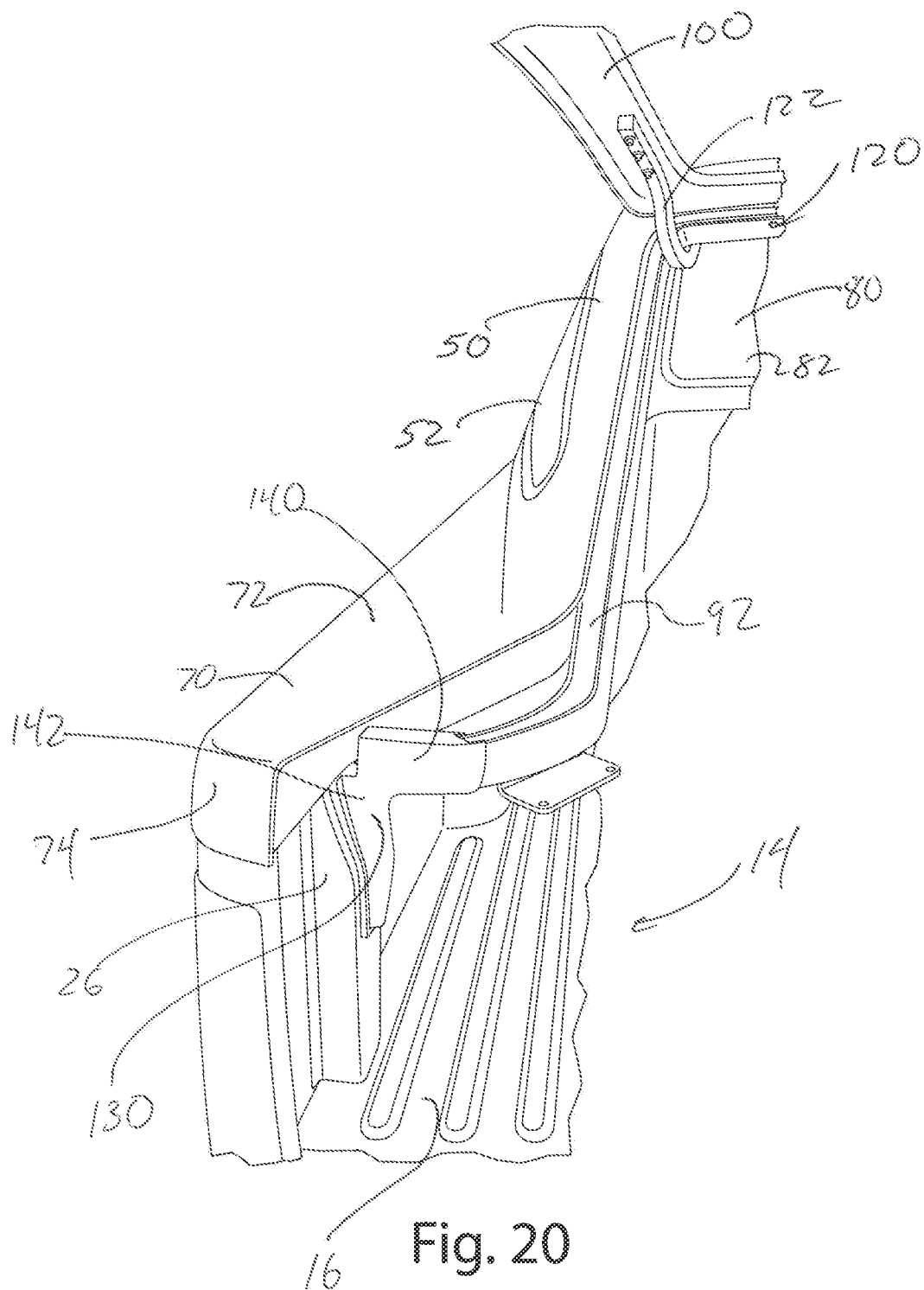
FIG. 20 is a partial rear perspective view of the truck cap assembly in an open position showing placement of the drain channel or drain member relative to the pickup.
Figure 21:
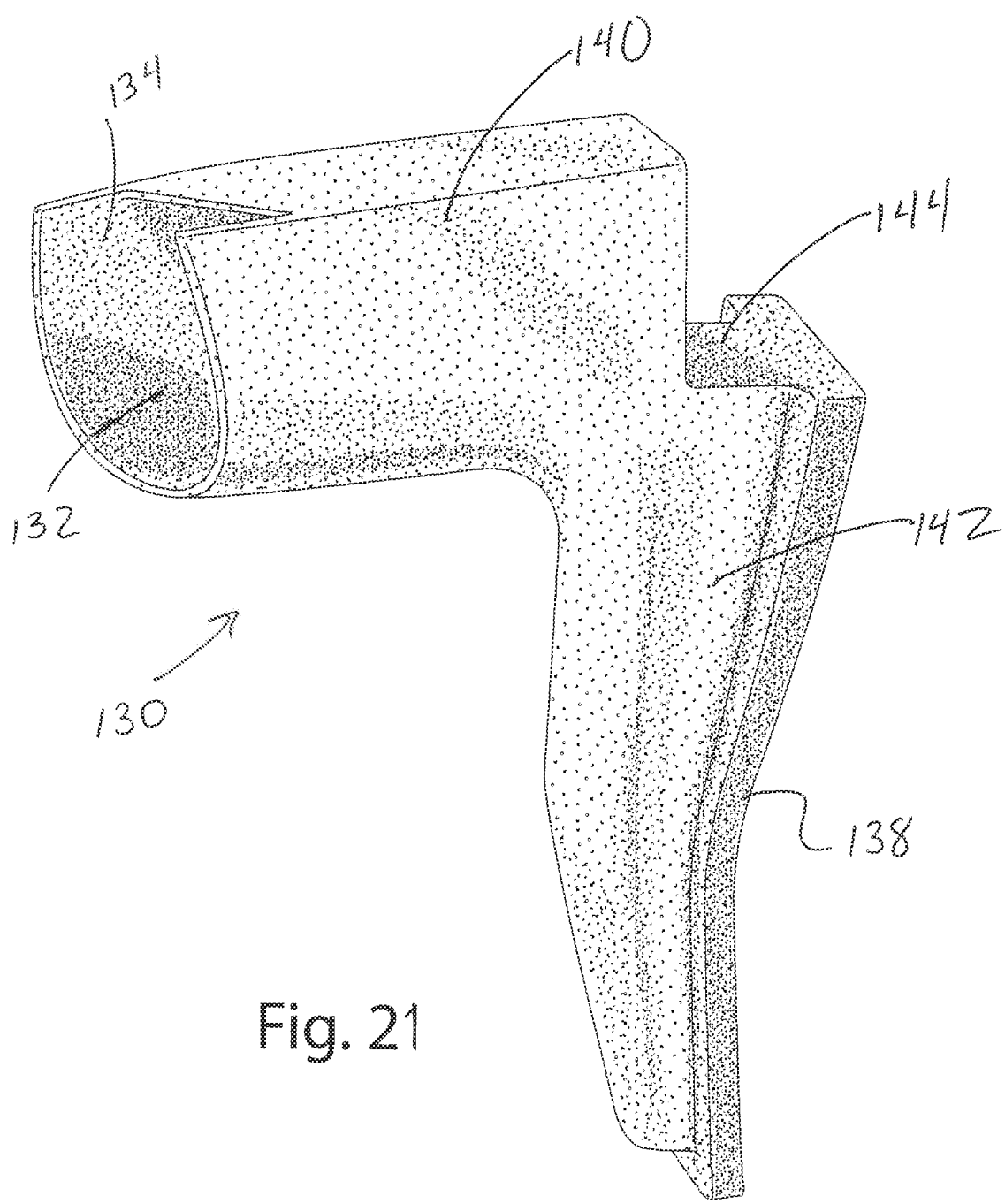
FIG. 21 is a perspective view of an exemplary drain channel, the drain channel for the opposing side being a mirror image thereof.
Figure 22:
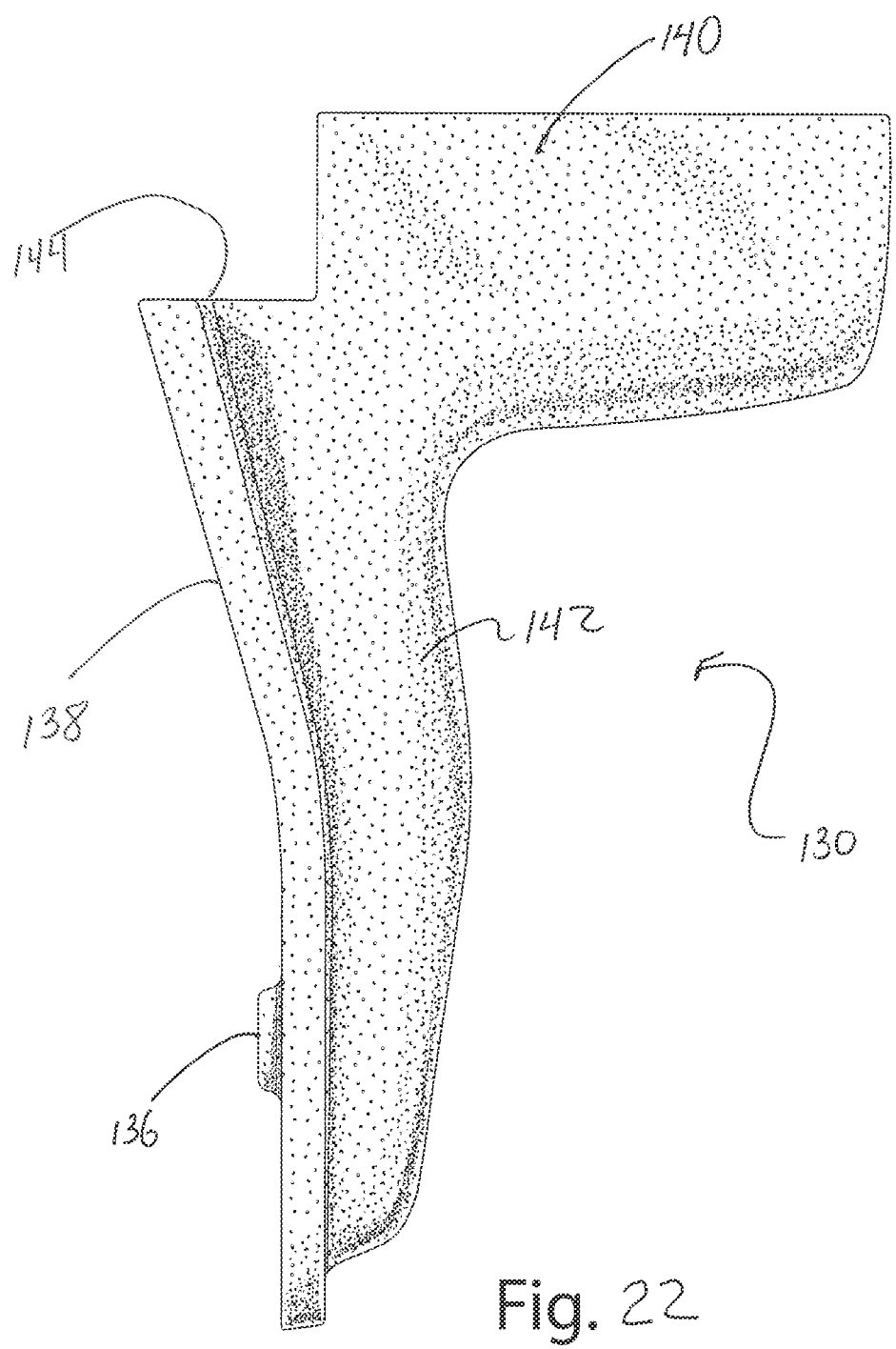
FIG. 22 is a front elevational view of a left side drain channel, the right side being a mirror image thereof.
Figures 23, 24:
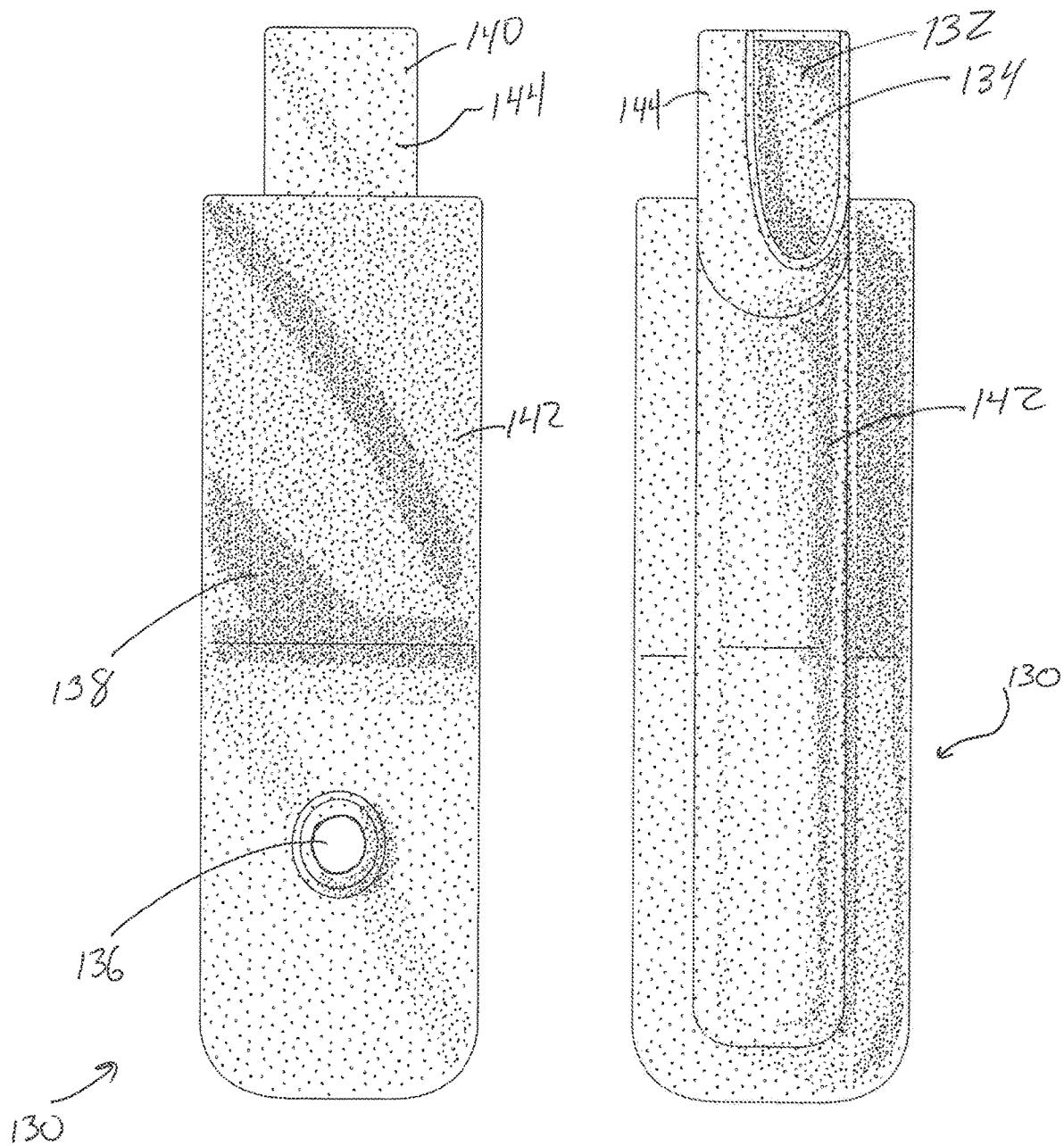
FIG. 23 is a left side view of the left side drain channel in FIG. 22.
FIG. 24 is a right side view of the left side drain channel in FIG. 22.
Figure 25:
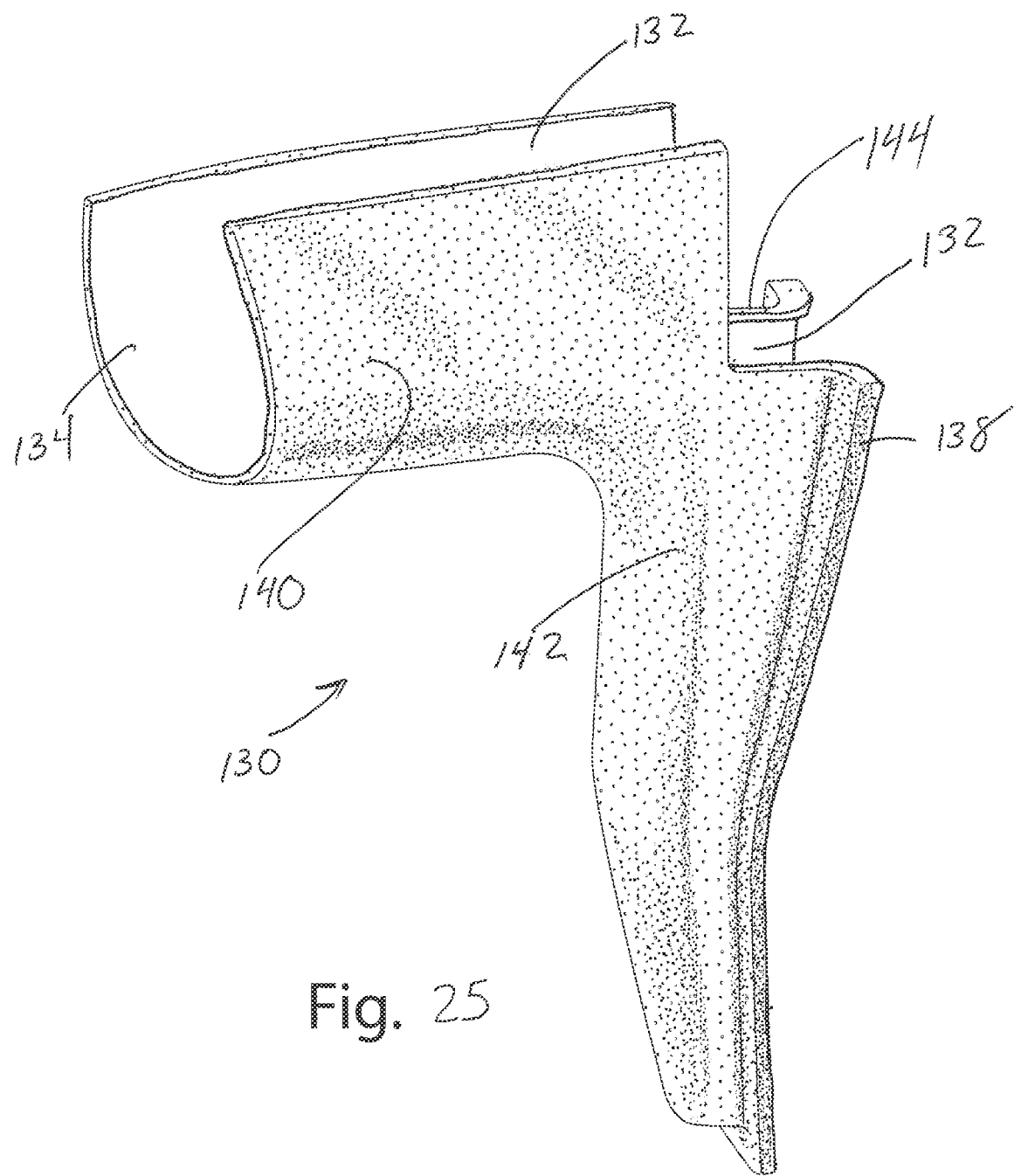
FIG. 25 is an exemplary drain channel having an open channel, the drain channel for the opposing side being a mirror image thereof.
Figures 26, 27:
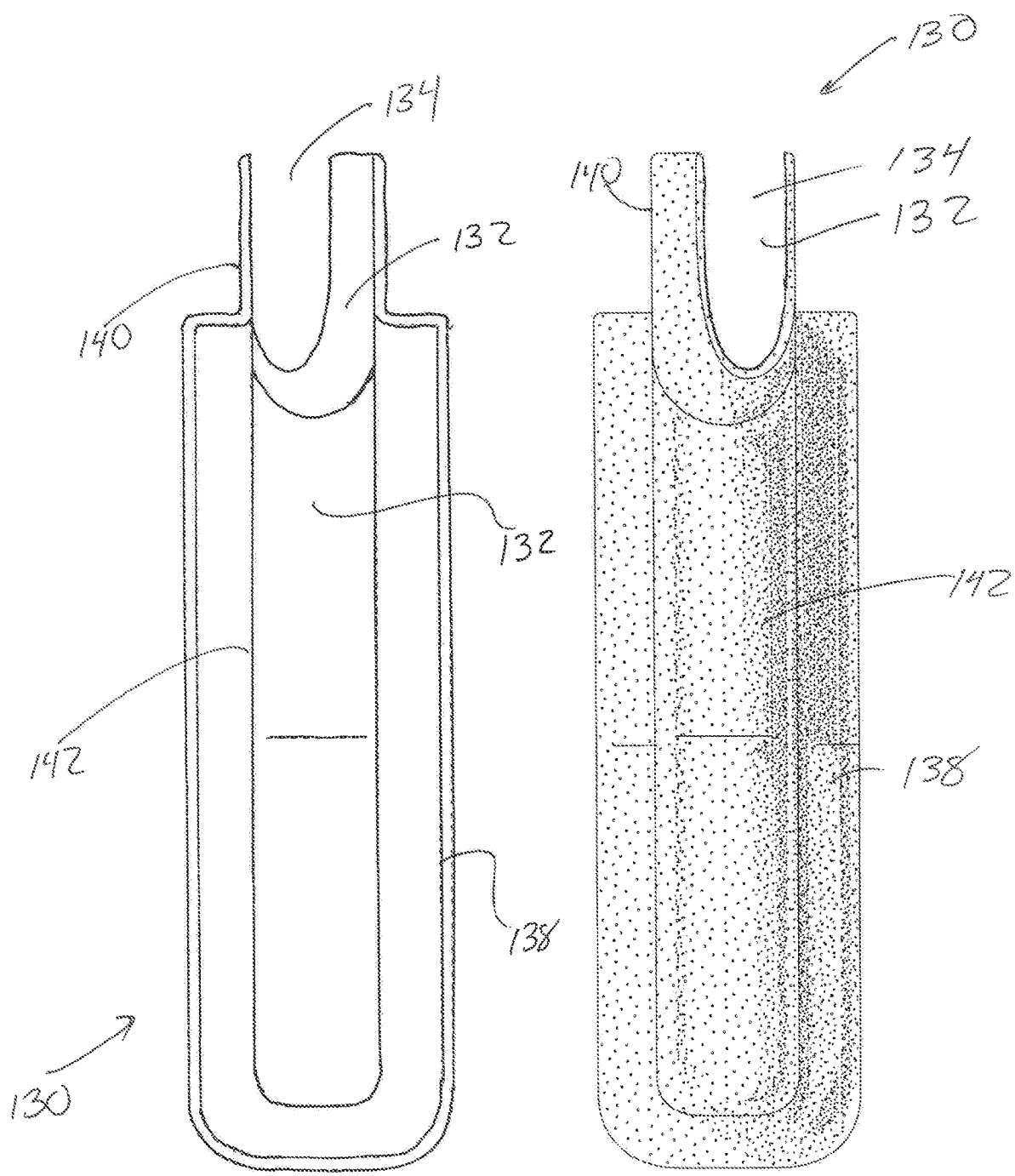
FIG. 26 is a right side view of the drain channel in FIG. 25.
FIG. 27 is a left side view of the drain channel in FIG. 25.
Figure 28:
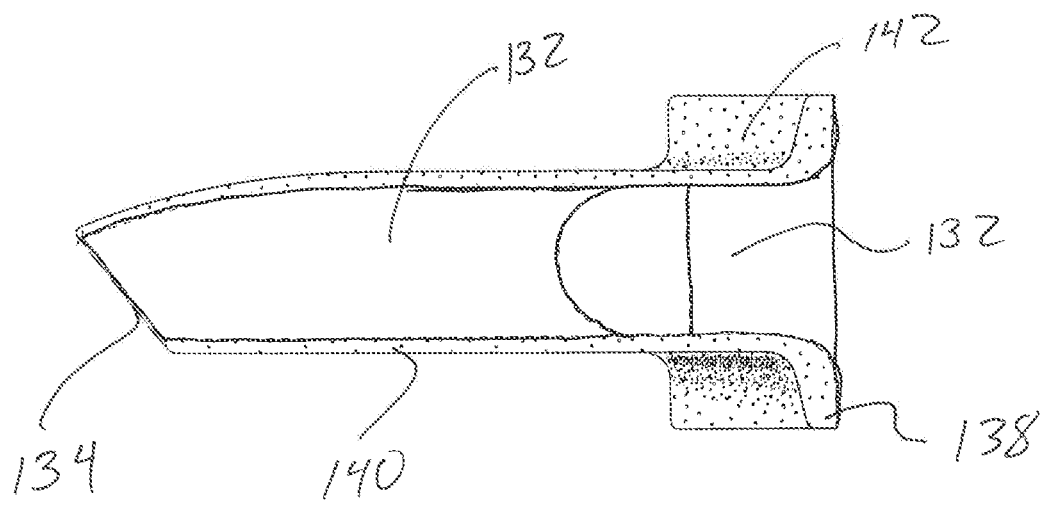
FIG. 28 is a top view of the drain channel in FIG. 25.

As illustrated in FIGS. 15 and 20, the sidewalls 18, 20 may include a bed support or structural support 26. This many include a hole (not shown), which may be from the factory or be added. The structural support 26 includes a contoured profile. Of course one skilled in the art would recognize that the profile and location of the structural support 26 would vary, which is why the cap assembly 10 of the present invention uses a separate drain channel or drain member 130 to interface between the edge channel 92 on the stationary portion to channel the water out of the cargo area 14 to keep the cargo hold 14 and of course items in it dry. Using a separate interface member, such as the drain support allows reduced tooling costs for the bed cover assembly 30 as the sidewalls and lengths of pickup trucks, plus the width of the beds are fairly standardized in a couple of sizes, however the interior configuration and location of support members is not standardized and especially the profile of the bed support or structural support members 26 varies widely even within different vehicles from the same manufacturer and even on different bed sizes on the same vehicle. Therefore, the bed cover assembly, while it could be configured to work without the drain channel 130, it has been determine to be helpful. Of course, the drain channel 130 must be configured to take abuse of items loose in the cargo hold 40 and being impacted as things are pulled in and out and yet has to have a minimal profile to avoid such collisions and avoid taking up space in the cargo area. Therefore, the present invention has developed a special drain channel having a horizontal portion 140 and a vertical portion 142, with the vertical portion having a bed engagement portion that is contoured to match or me a mirror image of the profile of the structural support 26. As illustrated in the figures, in some instances an outlet 136 may be sealed to an existing hole in the structural support, or one can be added to allow water to be channeled out of the cargo hold 14 through the structural support 26. The horizontal portion is configured to extend to and engage the edge channel 92. Due to the unique configuration it is likely that the left and right drain channels would be different in shape, and likely a mirror image of each other. The drain channel 130 includes a channel, which may be an open channel or internal channel extending through the horizontal and vertical portions 140, 142. In addition one could have an internal channel 122 and the other an open channel. As illustrated the drain channel 130 includes a bed rail cutout that allows it to be configured to fit around the bed rail at the top of the sidewalls 18, 20.

The hatch member 100 can open and close to selectively expose an open interior. The hatch member 100 may include a rectangularly shaped glass panel or other transparent panel and may include a plurality of louvers which overlie the glass panel and which extend widthwise across the hatch member. The glass panel and louvers are less wide than the pickup bed and are, in a lateral direction, centered with respect to the pickup bed. The louvers extend in parallel relationship with one another and in parallel relationship with a floor of the pickup bed to present gaps between adjacent louvers. The louvers contribute to the bed cover's sporty appearance and aerodynamic shape of the vehicle but minimally, if at all, impairing a driver's vision behind the vehicle.

A back end of the hatch member presents a flat surface which extends in a generally horizontal plane from a back edge of the glass panel to the tailgate of the pickup. The flat surface flares laterally outwardly from the back edge of the glass panel towards the side edges of the tailgate such that the flat surface has a trapezoidal shape. A back edge of the hatch member extends past an upper back edge of the tailgate and is bent downwardly to restrict the passage of rain water into the bed.

Figure 3:
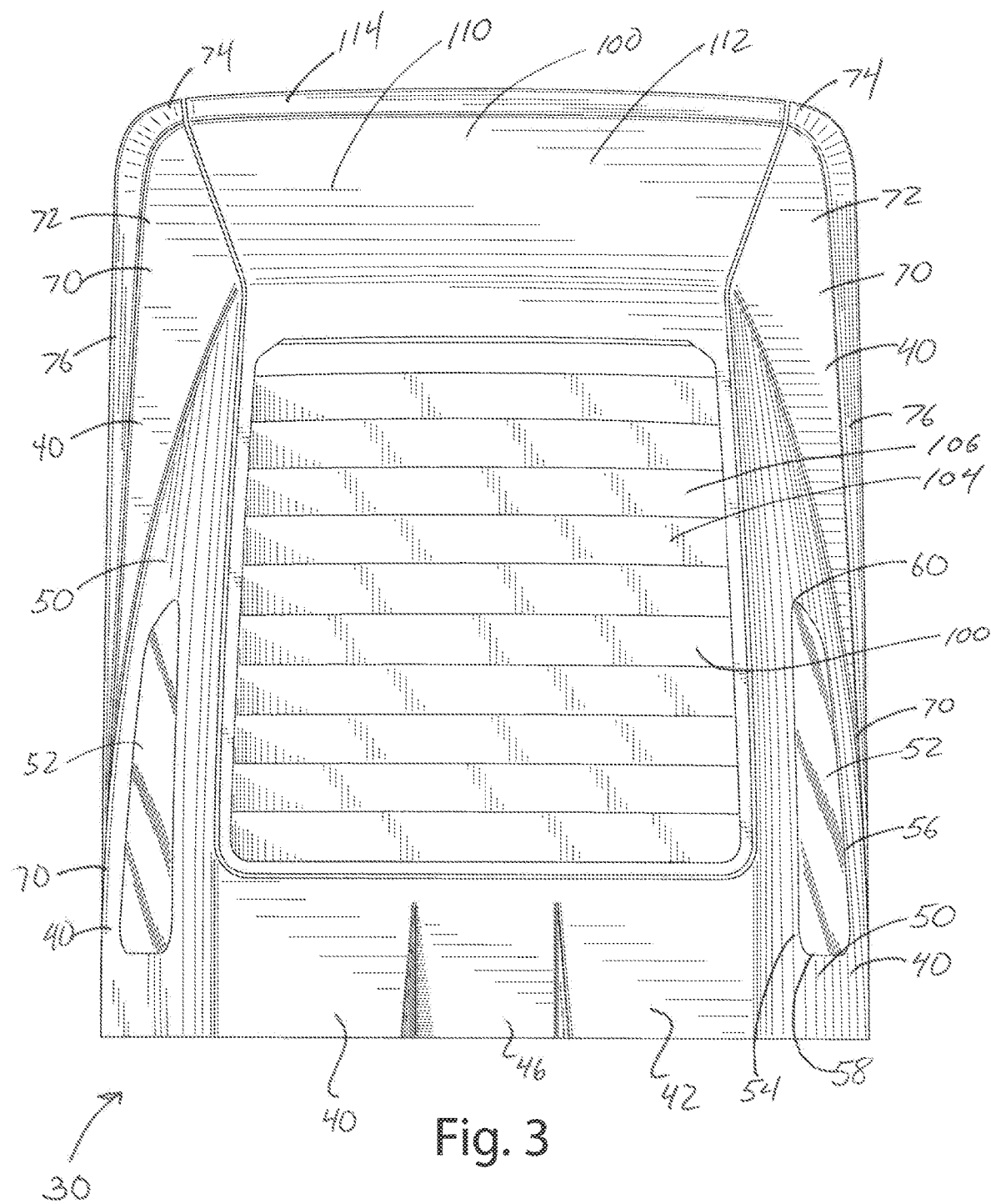
FIG. 3 is a top plan view of the truck cap assembly.

As shown in the Figures, the hatch member can raise up to allow easy access to the pickup bed. To facilitate the opening of the hatch member, the bed cover includes a pair of question mark shaped hinges which are fixedly attached with a frame of the stationary piece and with a frame of the hatch member to allow the hatch member to pivot about a pivot axis relative to the stationary piece of the bed cover. For each of the question mark shaped hinges, a distal end is pivotably attached with the frame of the stationary piece, and a long leg is fixedly attached with a longitudinally extending rail of the frame of the hatch member. As shown in FIG. 3, when the hatch member opened, the question mark shaped hinges allow a top edge of the hatch member to raise above the stationary piece of the bed cover such that rain water is restricted from entering the pickup bed when the hatch member is open and to prevent interference between the top edge of the hatch member and the stationary piece of the bed cover.

As shown in Figures, the long leg of each of the question mark shaped hinges has a pair of longitudinally extending slots through which fasteners extend to interconnect the question mark shaped hinges with the frame of the hatch member. The longitudinally extending slots allow for adjustment in the connection between the hatch member and the stationary piece of the bed cover to ensure that these components are properly aligned with respect to one another. The bed cover also includes a pair of dampers and/or actuators which are pivotably connected with and extend between the frames of the hatch member and the stationary piece for holding the hatch member in the open position. In the case of actuators, they may be gas or electrically charged for allowing the hatch member to automatically be lifted from the closed position to the open position.

As shown in Figures, the stationary piece of the bed cover presents an upwardly opening channel, or receiving trough, which extends through a U-shape around an opening, and the hatch member has a downwardly opening channel, or receiving trough, which is offset from the channel of the stationary piece. The hatch member includes a first seal that is received in the channel of the stationary piece, and the stationary piece includes a second seal that is received in the channel of the hatch member such that a double-seal is established between the hatch member and the stationary piece. Such a double seal is especially resistant to the passage of water into the pickup bed when the hatch member is in the closed position. The double seal conveys water along the side of the hatch member and down to the rear of the pickup bed. An adapter is provided to convey the water into a rear tunnel of the pickup where it is then directed out of the pickup. Thus, the bed cover is especially water tight for protecting contacts in the bed.

The stationary piece of the bed cover includes a pair of side walls and a top wall which extends between the side walls. The bed cover also includes a pair of side panels which overlie and extend upwardly from the side walls of the pickup bed. Each of the side panels is generally triangular in shape and has a generally triangularly shaped window. The side walls are angled from adjacent the cab of the pickup to the point where the hatch member flares outwardly. The top wall of the stationary piece has a tail light fixture above the glass pane. The tail light fixture could be a light bar, such as with light emitting diodes (LEDs), which is electrically connected with the pickup's electrical system. Alternately, the tail light fixture could be a light pipe which channels light emitted from a tail light at the top-back edge of the pickup cab.

Obviously, many modifications and variations of the present invention are possible in light of the above teachings and may be practiced otherwise than as specifically described while within the scope of the appended claims.

What is claimed is:

1. A truck cap assembly configured to be attached to the cargo hold of a pickup, the cargo hold having side rails, a front rail and a tailgate, and a horizontal bed extending therebetween and wherein the side rails are generally arranged parallel to a longitudinal axis of the pickup, the truck cap assembly comprising:

a stationary portion which is fixable with a the side rails of the cargo hold and wherein the stationary portion defines a hatch opening;

a hatch member operably connected with said stationary piece and selectively movable relative to said stationary portion between an open position which exposes said hatch opening in said stationary portion and a closed position wherein said hatch member covers said hatch opening;

a pair of hinges operably connecting said hatch member with said stationary portion and allowing said hatch member to move between said open and closed positions; and each of said hinges being generally question mark-shaped for allowing a back edge of said hatch member to raise above said an adjacent portion of said stationary piece for guiding rain water away from said opening when said hatch member is in said open position and for preventing interference between said hatch member and said stationary piece when said hatch member is moved between said open and closed positions.

2. The truck cap assembly of claim 1, wherein said stationary portion includes a pair of opposing bed rail supports each having an inwardly extending portion and an outer lip, and a side wall extending upwardly from each bed rail support, and an upper cross member extending between each side wall, wherein each of said sidewalls, opposing bed rail supports and upper cross member define a hatch opening, and said hatch member having an upper edge, an inclined portion and a tail portion; and wherein said stationary member includes opposing sidewalls extending upwardly and inwardly and wherein the inclined portion of the hatch member extends downwardly from said upper edge to said tail portion.

3. The truck cap assembly of claim 2 wherein said inwardly extending portion includes an end lip and wherein said inwardly extending portion increases in width as said inwardly extending portion approaches said end lip, and wherein each of said sidewalls is curved inwardly toward each other and is reduced in height as said sidewalls approach said end lip.

4. The truck cap assembly of claim 2 wherein each of said sidewalls extends inwardly toward each other as said sidewalls increase in height from said opposing bed rail supports, and further wherein the truck cap assembly includes a rear end wall extending between said sidewalls and said upper cross member and wherein said sidewalls extend from said rear end wall to said end lip on said inwardly extending portion but do not reach said end lip.

5. The truck cap assembly of claim 2 wherein each of said sidewalls includes a window and said hatch member includes a window in said inclined portion.

6. The truck cap assembly of claim 2 wherein said inclined portion has one upwardly extending angle relative to the horizontal bed of 15-25 degrees.

7. The truck cap assembly of claim 2 wherein said hatch member includes an inclined portion and a tail portion extending therefrom and wherein said tail portion is angled relative to said inclined portion and ends in an outer lip, and wherein said tail portion includes an intermediate portion between said inclined portion and said outer lip that extends beyond the tailgate and over the horizontal bed.

8. The truck cap assembly of claim 2 wherein said stationary portion includes an inner edge around the periphery of the hatch opening and wherein said inner edge includes an edge channel.

9. The truck cap assembly of claim 8 further including a drain channel configured to prevent water in the edge channel from entering the cargo hold by diverting water through a channel from an opening engaging the edge channel to an outlet proximate the side walls of the pickup.

10. The truck cap assembly of claim 2 further including a support plane formed by the lower surfaces of the opposing bed rail supports, rear end wall, and tail portion wherein in said open position said hatch member is parallel with or angled upward away from said support plane as said hatch member extends away from said upper cross member and wherein said hatch member is spaced from and extends over said support plane between the tailgate and said upper cross member and wherein the truck cap assembly has a length along the longitudinal axis of pickup and wherein the hatch member extends along the longitudinal axis for the majority of the length, but does not extend for the whole length.

11. The truck cap assembly of claim 10 wherein said hatch member has an inclined portion including a hatch window and wherein said hatch window is arranged to be more parallel to the support plane than perpendicular to the support plane.

12. The truck cap assembly of claim 2 wherein each sidewall includes a side window and wherein said side window has a front edge and an opposing rear edge and bottom edge and an upper edge and wherein said sidewalls are configured so that said rear edge is disposed closer to the tailgate than said front edge and wherein said rear edge is displaced inward toward the longitudinal axis relative to the front edge and wherein said upper edge is displaced inward toward the longitudinal axis relative to the lower edge.

13. The truck cap assembly of claim 10 wherein said hatch member has an inclined portion including a hatch window and wherein said hatch window is inclined less than 30 degrees from the support plane and wherein said side windows are each inclined more than 50 degrees, but less than 90 degrees relative to the support plane.

14. The truck cap assembly of claim 2 wherein at least one of said stationary portion and said hatch member include an edge channel and the other of said stationary portion and said hatch includes a protrusion configured to fit within said edge channel and when said hatch member is in said closed position, said a sealing member coupled to one of said stationary portion and said hatch member is in sealing contact with the other of said hatch member and said stationary portion.

15. The truck cap assembly of claim 14 wherein said edge channel is located on the stationary portion and the truck cap assembly further includes a drain channel configured to sealing engage said edge channel and divert water from entering the cargo hold and wherein said drain channel includes a channel extending between an opening and an outlet and wherein the outlet is proximate the sidewalls of the pickup.

16. A truck cap assembly configured to be attached to the cargo hold of a pickup, the cargo hold having side rails, a front rail and a tailgate, and a horizontal bed extending therebetween and wherein the side rails are generally arranged parallel to a longitudinal axis of the pickup, the truck cap assembly comprising:
a stationary portion which is fixable with the side rails of the cargo hold and wherein the stationary portion defines a hatch opening;
a hatch member operably connected with said stationary piece and selectively movable relative to said stationary portion between an open position which exposes said hatch opening in said stationary portion and a closed position wherein said hatch member covers said hatch opening;
said stationary portion having an edge channel and wherein one of said match member and said stationary portion is coupled to at least one sealing member extending along the periphery of the inner edge of the hatch member of inner edge of the stationary portion; and
when said hatch member is in said closed position, said sealing member of said stationary portion being in sealing contact with said channel and said sealing member being in sealing contact between said hatch member and said stationary portion.

17. The truck cap assembly of claim 16 further including a pair of hinges operably connecting said hatch member with said stationary portion and allowing said hatch member to move between said open and closed positions; and each of said hinges being generally question mark-shaped for allowing a back edge of said hatch member to raise above said an adjacent portion of said stationary piece for guiding rain water away from said opening when said hatch member is in said open position and for preventing interference between said hatch member and said stationary piece when said hatch member is moved between said open and closed positions.

18. The truck cap assembly of claim 16, wherein said stationary portion includes a pair of opposing bed rail supports each having an inwardly extending portion and an outer lip, and a side wall extending upwardly from each bed rail support, and an upper cross member extending between each side wall, wherein each of said sidewalls, opposing bed rail supports and upper cross member define a hatch opening, and said hatch member having an upper edge, an inclined portion and a tail portion; and wherein said stationary member includes opposing sidewalls extending upwardly and inwardly and wherein the inclined portion of the hatch member extends downwardly from said upper edge to said tail portion.

19. The truck cap assembly of claim 18 wherein said inwardly extending portion includes an end lip and wherein said inwardly extending portion increases in width as said inwardly extending portion approaches said end lip, and wherein each of said sidewalls is curved inwardly toward each other and is reduced in height as said sidewalls approach said end lip.

20. The truck cap assembly of claim 18 wherein each of said sidewalls extends inwardly toward each other as said sidewalls increase in height from said opposing bed rail supports, and further wherein the truck cap assembly includes a rear end wall extending between said sidewalls and said upper cross member and wherein said sidewalls extend from said rear end wall to said end lip on said inwardly extending portion but do not reach said end lip.

21. The truck cap assembly of claim 18 wherein said hatch member includes an inclined portion and a tail portion extending therefrom and wherein said tail portion is angled relative to said inclined portion and ends in an outer lip, and wherein said tail portion includes an intermediate portion between said inclined portion and said outer lip that extends beyond the tailgate and over the horizontal bed.

22. The truck cap assembly of claim 18 further including a support plane formed by the lower surfaces of the opposing bed rail supports, rear end wall, and tail portion wherein in said open position said hatch member is parallel with or angled upward away from said support plane as said hatch member extends away from said upper cross member and wherein said hatch member is spaced from and extends over said support plane between the tailgate and said upper cross member and wherein the truck cap assembly has a length along the longitudinal axis of pickup and wherein the hatch member extends along the longitudinal axis for the majority of the length, but does not extend for the whole length.

23. The truck cap assembly of claim 22 wherein said hatch member has an inclined portion including a hatch window and wherein said hatch window is arranged to be more parallel to the support plane than perpendicular to the support plane.

24. The truck cap assembly of claim 18 wherein each sidewall includes a side window and wherein said side window has a front edge and an opposing rear edge and bottom edge and an upper edge and wherein said sidewalls are configured so that said rear edge is disposed closer to the tailgate than said front edge and wherein said rear edge is displaced inward toward the longitudinal axis relative to the front edge and wherein said upper edge is displaced inward toward the longitudinal axis relative to the lower edge.

25. The truck cap assembly of claim 18 wherein said hatch member has an inclined portion including a hatch window and wherein said hatch window is inclined less than 30 degrees but more than 10 degrees from the support plane and wherein said side windows are each inclined more than 50 degrees, but less than 90 degrees relative to the support plane.

26. The truck cap assembly of claim 16 wherein said inclined portion includes a transparent panel and a tail portion with a generally flat surface which extends in a horizontal plane and which has a generally trapezoidal shape.

27. The truck cap assembly of claim 16 further including a drain channel member and wherein said stationary portion further includes an edge channel and said drain channel member diverts water from said edge channel out of the cargo hold.

28. The truck cap assembly of claim 27 wherein said drain channel includes a channel extending between an opening and an outlet and wherein said opening engages said edge channel and wherein said outlet is proximate to the side rails and wherein said drain channel includes a horizontal portion and a vertical portion and wherein vertical portion includes a bed engagement portion configured to have a mirror image contour to a side wall contour and wherein the horizontal portion and vertical portions meet at a bed rail cutout.

29. The truck cap assembly of claim 28 wherein the channel is substantially internal to the horizontal and vertical portions and wherein the horizontal portion includes a horizontal axis and said vertical portion includes a vertical axis and wherein said horizontal axis is arranged approximately perpendicular to said vertical axis.

30. A truck cap assembly, comprising:
   a stationary portion which is fixable with a the side walls of a pickup bed and which has an opening;
   a hatch member operably connected with said stationary portion and selectively movable relative to said stationary portion between an open position which exposes said opening in said stationary portion and a closed position wherein said hatch member covers said opening; and
   said hatch member having an inclined portion with a glass panel and a tail portion with a generally flat surface which extends in a horizontal plane and which has a generally trapezoidal shape.

31. A drain channel member for a truck cap assembly configured to fit over the cargo hold of a pickup and wherein the cargo hold of the pickup includes a horizontal bed, opposing sidewalls, a rear end and a pivotable tailgate, and wherein the sidewalls include a structural support having a support contour and wherein the drain channel member for a truck cap assembly comprising:
   a horizontal portion including an opening and a vertical portion having a sidewall engagement portion configured to engage the structural support and wherein said sidewall engagement portion has a contour that is substantially a mirror image of the support contour.

32. The drain channel member for a truck cap assembly of claim 31 wherein said vertical portion includes an outlet and a channel extends between the opening on said horizontal portion to said outlet.

33. The drain channel member for a truck cap assembly of claim 31 wherein the truck cap assembly includes a stationary portion and a hatch member and said stationary portion includes an edge channel configured to engage said opening on said drain channel member.

* * * * *